US010389980B2

(12) United States Patent
Izawa et al.

(10) Patent No.: US 10,389,980 B2
(45) Date of Patent: Aug. 20, 2019

(54) CAMERA SYSTEM AND REFRIGERATOR

(71) Applicant: Toshiba Lifestyle Products & Services Corporation, Ome-shi, Tokyo (JP)

(72) Inventors: Hirokazu Izawa, Ome (JP); Kazuhiro Furuta, Ome (JP); Yuuki Marutani, Ome (JP); Kota Watanabe, Ome (JP); Yuki Takahashi, Ome (JP); Ryo Kawada, Ome (JP)

(73) Assignee: TOSHIBA LIFESTYLE PRODUCTS & SERVICES CORPORATION, Tokyo (JP)

(*) Notice: Subject to any disclaimer, the term of this patent is extended or adjusted under 35 U.S.C. 154(b) by 263 days.

(21) Appl. No.: 15/053,573

(22) Filed: Feb. 25, 2016

(65) Prior Publication Data

US 2016/0182864 A1    Jun. 23, 2016

Related U.S. Application Data

(63) Continuation of application No. PCT/JP2014/067543, filed on Jul. 1, 2014.

(30) Foreign Application Priority Data

Aug. 27, 2013 (JP) ................................ 2013-175596
Oct. 30, 2013 (JP) ................................ 2013-225438

(51) Int. Cl.
*H04N 7/18* (2006.01)
*H04N 1/00* (2006.01)
(Continued)

(52) U.S. Cl.
CPC ......... *H04N 7/181* (2013.01); *H04N 1/00244* (2013.01); *H04N 1/00307* (2013.01);
(Continued)

(58) Field of Classification Search
CPC .......... H04N 7/181; H04N 5/247; H04N 5/44; H04N 5/2251; H04N 5/23293;
(Continued)

(56) References Cited

U.S. PATENT DOCUMENTS 5,691,684 A * 11/1997 Murrah ................ G06Q 10/087
                                                              235/385
6,204,763 B1 * 3/2001 Sone ..................... A47G 29/141
                                                              221/2
(Continued)

FOREIGN PATENT DOCUMENTS

JP    2002-295959    10/2002
JP    2003-090673    3/2003
(Continued)

OTHER PUBLICATIONS

Taiwan Office Action with English Translation issued in TW 10520821310 dated Jul. 4, 2016.
(Continued)

*Primary Examiner* — Sathyanaraya V Perungavoor
*Assistant Examiner* — Philip P. Dang
(74) *Attorney, Agent, or Firm* — DLA Piper LLP US

(57) ABSTRACT

One embodiment of a camera system is provided with a camera device serving as an image capturing unit; a communication unit configured to transmit image information captured by the camera device to an external device; and a display terminal configured to display image information captured by the camera device, the display terminal being configured to display at least either of image information captured by the camera device according to prescribed conditions and image information captured according to user instructions.

15 Claims, 14 Drawing Sheets

Figure 1:
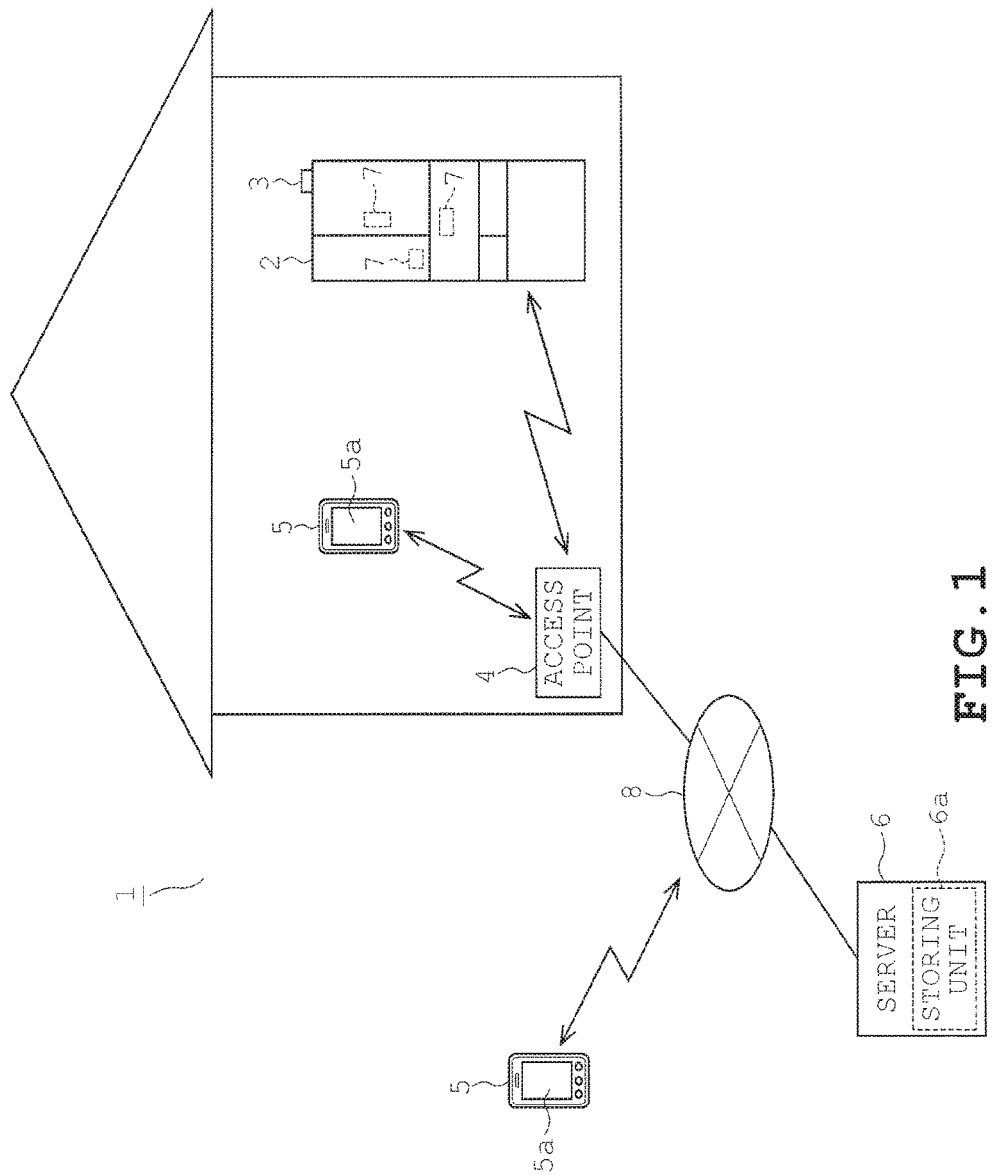

(51) Int. Cl.
　　*H04N 5/225*　　(2006.01)
　　*H04N 5/232*　　(2006.01)
　　*H04N 5/247*　　(2006.01)
　　*H04N 5/44*　　(2011.01)

(52) U.S. Cl.
　　CPC ....... *H04N 1/00347* (2013.01); *H04N 5/2251* (2013.01); *H04N 5/2256* (2013.01); *H04N 5/23293* (2013.01); *H04N 5/247* (2013.01); *H04N 5/44* (2013.01); *H04N 2201/0075* (2013.01); *H04N 2201/0084* (2013.01); *H04N 2201/0096* (2013.01)

(58) Field of Classification Search
　　CPC ............. H04N 5/2256; H04N 1/00347; H04N 1/00307; H04N 1/00244; H04N 2201/0084; H04N 2201/0075; H04N 2201/0096
　　See application file for complete search history.

(56) References Cited

U.S. PATENT DOCUMENTS

| | | | | |
|---|---|---|---|---|
| 6,947,571 | B1 * | 9/2005 | Rhoads | G06Q 30/02 382/100 |
| 7,218,315 | B2 * | 5/2007 | Takeuchi | G06F 1/1626 345/1.1 |
| 7,447,330 | B2 * | 11/2008 | Yamasaki | G02B 3/14 382/100 |
| 7,755,566 | B2 * | 7/2010 | Hoisko | H04N 1/32128 345/1.1 |
| 7,920,898 | B2 * | 4/2011 | Callaghan | G06K 7/10772 455/556.1 |
| 8,004,571 | B2 * | 8/2011 | Yamashita | H04N 7/181 348/211.12 |
| 8,164,567 | B1 * | 4/2012 | Barney | A63F 13/428 345/158 |
| 8,248,237 | B2 * | 8/2012 | Fitzgerald | G06F 21/88 340/457 |
| 8,381,409 | B2 * | 2/2013 | Knoke | G01B 11/03 33/228 |
| 2005/0134710 | A1 * | 6/2005 | Nomura | H04N 5/2251 348/240.99 |
| 2006/0096303 | A1 | 5/2006 | Kavounas | |
| 2006/0174641 | A1 | 8/2006 | Liu et al. | |
| 2006/0274153 | A1 * | 12/2006 | Levien | H04N 1/00132 348/207.1 |
| 2007/0139529 | A1 * | 6/2007 | Levien | G06T 1/00 348/220.1 |
| 2008/0309617 | A1 * | 12/2008 | Kong | G06F 3/04817 345/157 |
| 2009/0021573 | A1 * | 1/2009 | Kim | H04N 5/44 348/14.02 |
| 2009/0315671 | A1 * | 12/2009 | Gocho | G03B 17/38 340/5.8 |
| 2010/0231506 | A1 * | 9/2010 | Pryor | G01F 23/292 345/156 |
| 2010/0283573 | A1 * | 11/2010 | Yum | F25D 29/00 340/3.1 |
| 2011/0007901 | A1 * | 1/2011 | Ikeda | H04B 5/02 380/270 |
| 2012/0144847 | A1 | 6/2012 | Lee et al. | |
| 2012/0208466 | A1 * | 8/2012 | Park | G06F 1/1601 455/41.3 |
| 2012/0212647 | A1 * | 8/2012 | Ueno | G03B 17/54 348/231.99 |
| 2012/0218301 | A1 * | 8/2012 | Miller | G02B 27/017 345/633 |
| 2012/0251079 | A1 * | 10/2012 | Meschter | G06F 19/3481 386/278 |
| 2013/0002903 | A1 * | 1/2013 | Manico | G06Q 50/2057 348/231.6 |
| 2013/0063550 | A1 * | 3/2013 | Ritchey | G16H 40/63 348/36 |
| 2013/0076936 | A1 * | 3/2013 | Yoshida | H04N 5/23219 348/222.1 |

FOREIGN PATENT DOCUMENTS

| | | |
|---|---|---|
| JP | 2004-183987 | 7/2004 |
| JP | 2007-329823 | 12/2007 |
| JP | 2010-151367 | 7/2010 |
| JP | 2011-047648 | 3/2011 |
| JP | 2012-193873 | 10/2012 |
| JP | 2013-124798 | 6/2013 |
| JP | 2015-065630 | 4/2015 |
| KR | 2002-0045817 | 6/2002 |
| KR | 2006-0030773 | 4/2006 |
| KR | 2006-0058565 | 5/2006 |
| KR | 2009-0020901 | 2/2009 |

OTHER PUBLICATIONS

Extended European Search Report issued in EP 14840477.5 dated Apr. 7, 2017.
International Search Report (with English Translation) dated Oct. 14, 2014 issued in PCT/JP2014/067543.
Written Opinion (with English Translation) dated Oct. 14, 2014 issued in PCT/JP2014/067543.
International Preliminary Report on Patentability dated Mar. 1, 2016 issued in PCT/JP2014/067543.
English Language Translation of JP 2002-295959 issued Oct. 9, 2002.
English Language Translation of JP 2012-193873 issued Oct. 11, 2012.
English Language Translation of JP 2004-183987 issued Jul. 2, 2004.
English Language Abstract of JP 2003-090673 issued Mar. 28, 2003.
Japanese Office Action issued in JP 2013-225438 dated Sep. 26, 2017.
Korean Office Action (with English Translation) issued in KR 2016-7003930 dated Feb. 2, 2017.
English Language Abstract and Translation of KR 2009-0020901 published Feb. 27, 2009.
English Language Abstract and Translation of KR 2002-0045817 published Jun. 20, 2002.
Korean Office Action issued in KR 2016-7003930 dated Jan. 2, 2018.
Korean Office Action issued in KR 10-2018-7022072 dated Sep. 2, 2018.
Japanese Office Action in JP Application No. 2018-037461 dated Jun. 12, 2019.

* cited by examiner

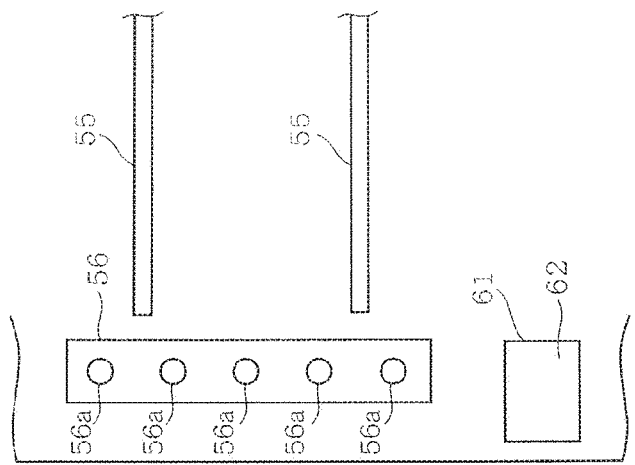
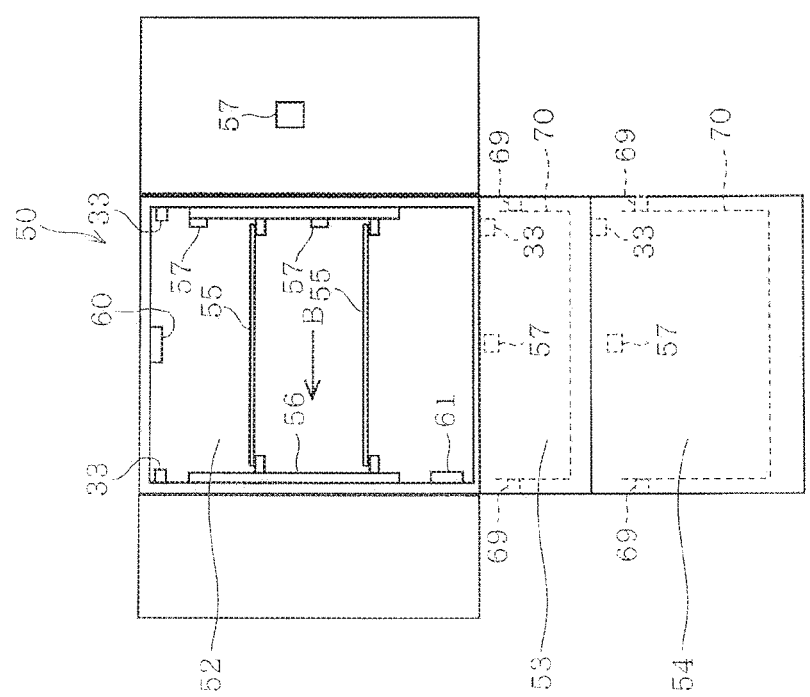
FIG. 9B
FIG. 9A

EACH SHELF OF REFRIGERATION CHAMBER
STORAGE CHAMBERS WITH DRAWER-TYPE DOORS
SUCH AS VEGETABLE CHAMBER, FREEZER, ETC.

CAMERA SYSTEM AND REFRIGERATOR

CROSS-REFERENCE TO RELATED APPLICATION(S)

This application is a continuation to an International Application No. PCT/JP2014/067543, filed on Jul. 1, 2014 which is based upon and claims the benefit of priority from Japanese Patent Application No. 2013-175596, filed on, Aug. 27, 2013 and Japanese Patent Application No. 2013-225438, filed on, Oct. 30, 2013 the entire contents of which are incorporated herein by reference.

FIELD

Embodiments disclosed herein relate to a camera system for viewing image information captured by a camera device with an external operation terminal.

BACKGROUND

A refrigerator has been proposed which is configured to manage food storage by image processing using a camera device provided inside its storage chamber.

However, there are some users who wish to view image information (image inside the refrigerator for example) captured by a camera device from remote locations.

BRIEF DESCRIPTIONS OF THE DRAWINGS

FIG. 1 pertains to a first embodiment and is a schematic view illustrating a camera system.

Figure 2:
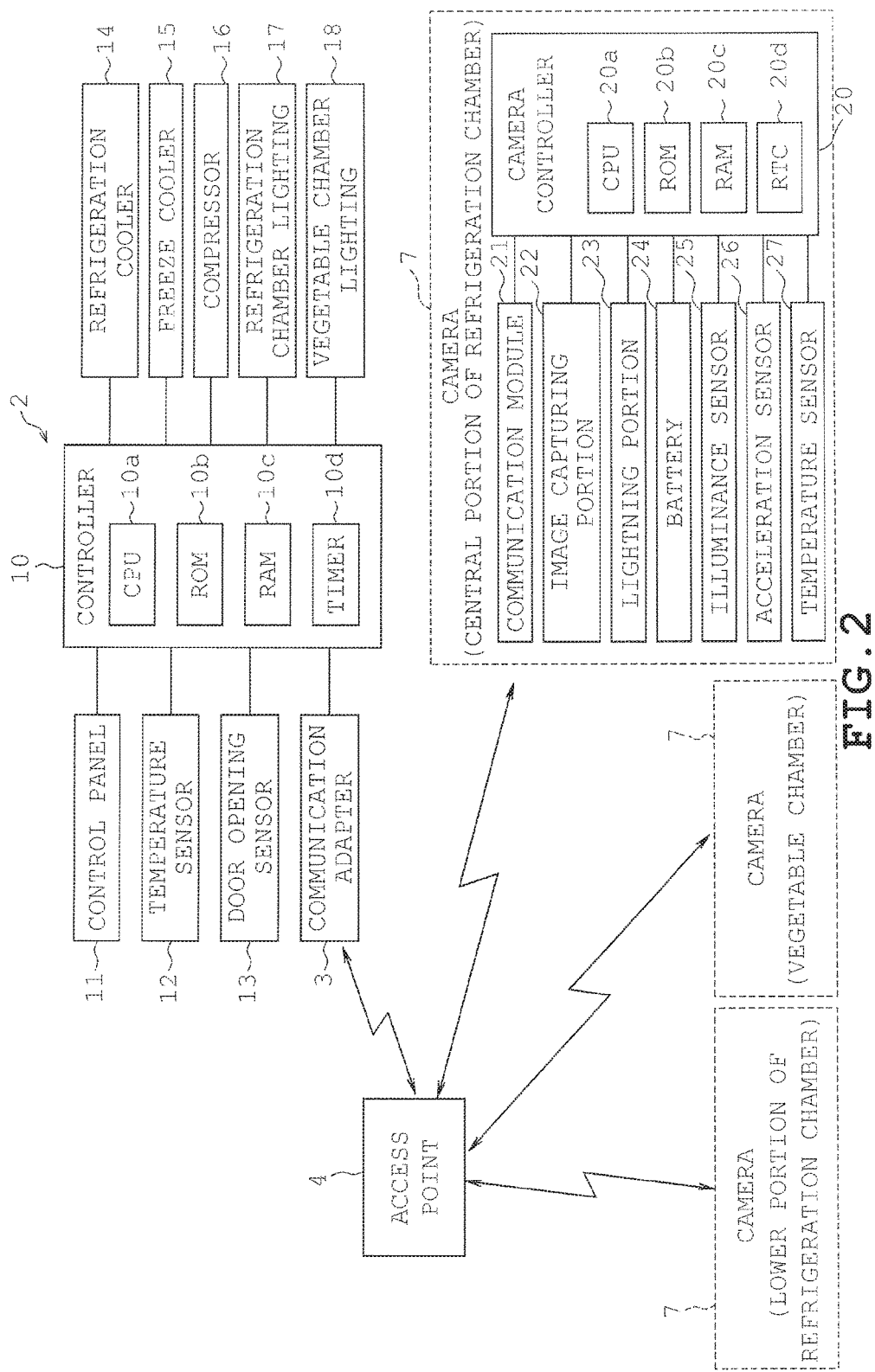

FIG. 2 pertains to the first embodiment and is a schematic view illustrating an electric configuration of the camera system.

Figure 3:
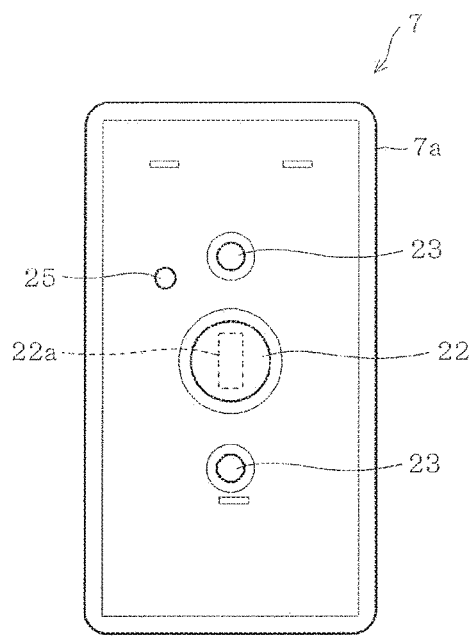

FIG. 3 pertains to the first embodiment and is a schematic view illustrating the external look of the camera device.

Figure 4:
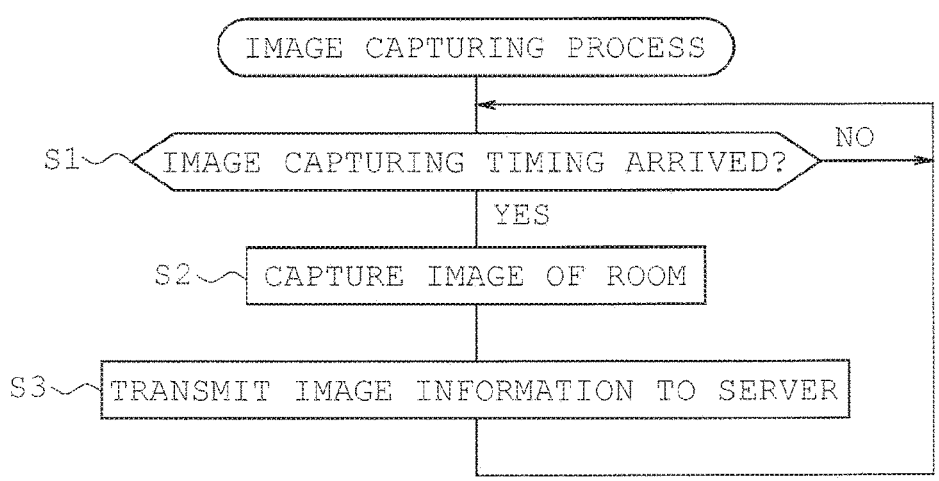

FIG. 4 pertains to the first embodiment and illustrates the process flow of an image capturing process executed by the camera device.

Figure 5:
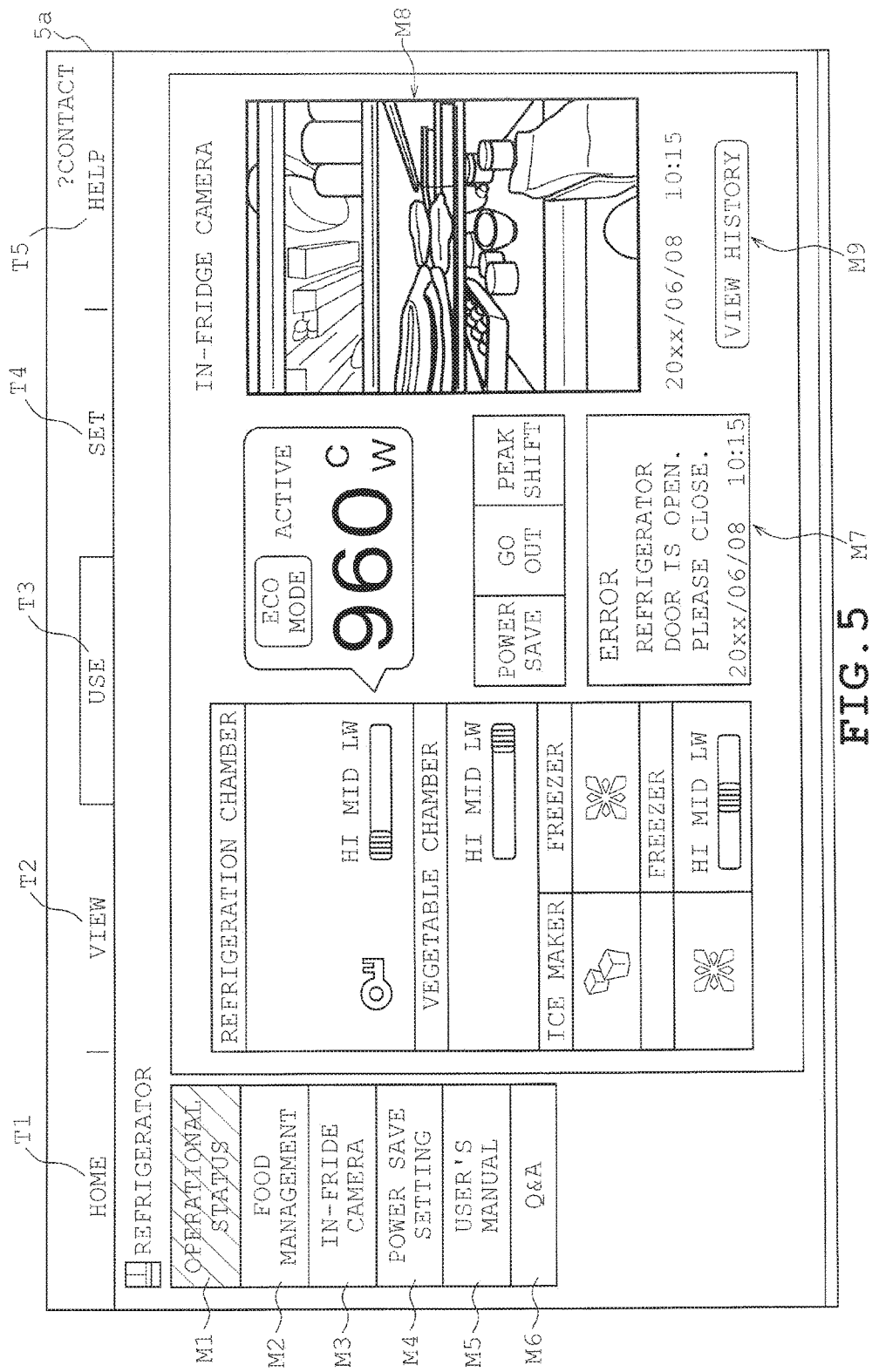

FIG. 5 pertains to the first embodiment and schematically illustrates one example of a top screen of a mobile terminal.

Figure 6:
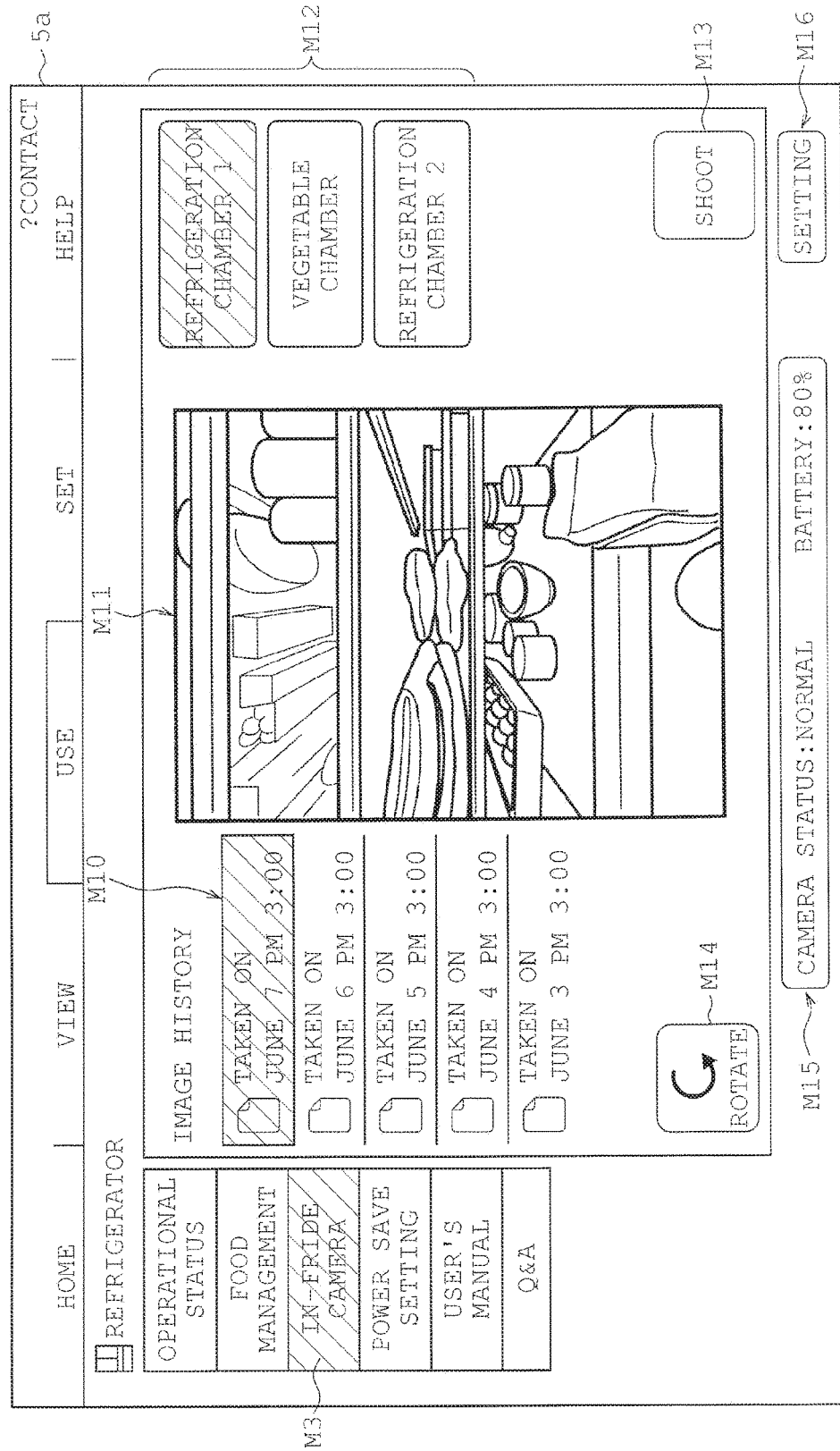

FIG. 6 pertains to the first embodiment and schematically illustrates one example of an image display screen of the mobile terminal.

Figure 7:
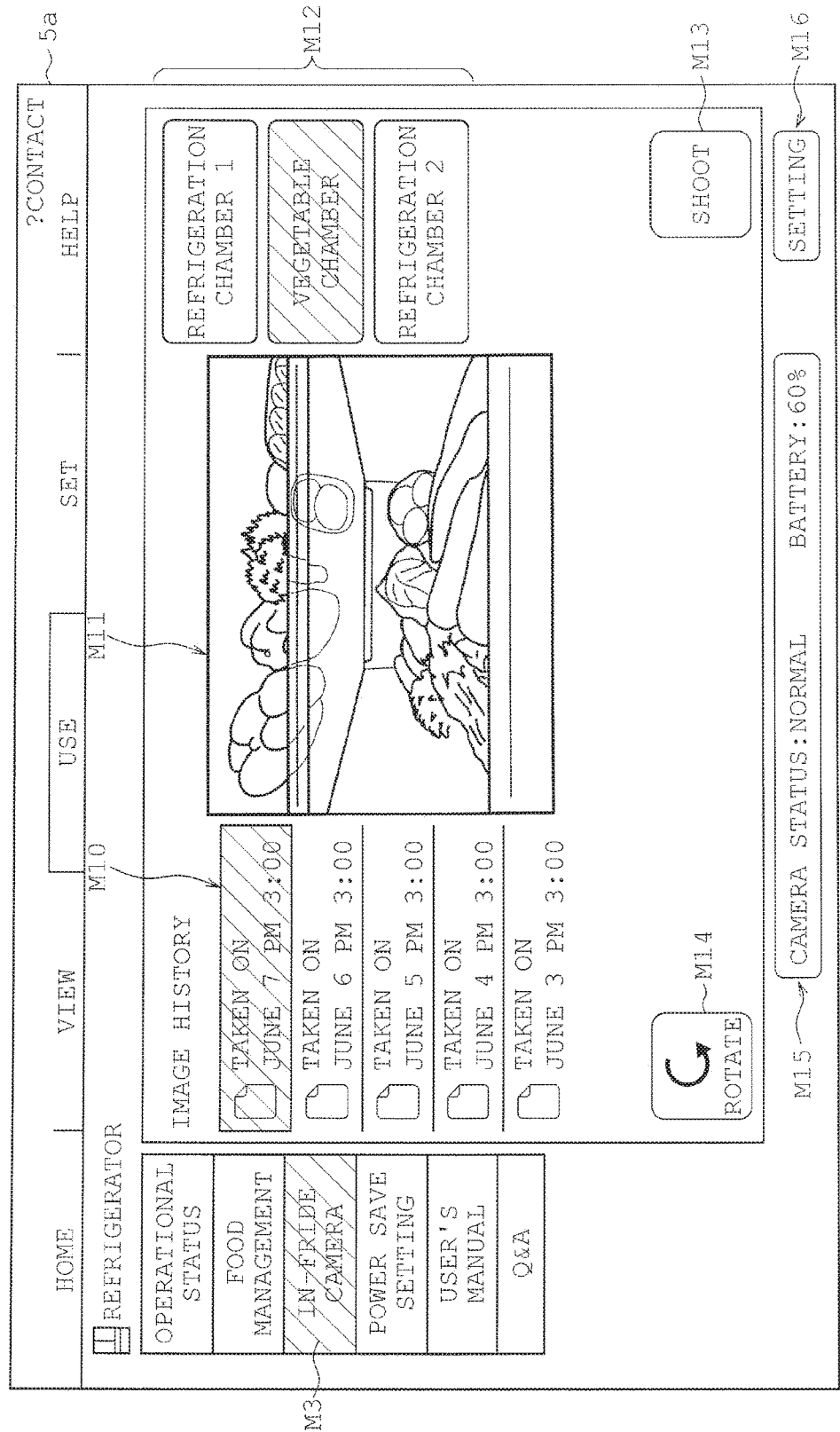

FIG. 7 pertains to the first embodiment and schematically illustrates another example of an image display screen of the mobile terminal.

Figure 8:
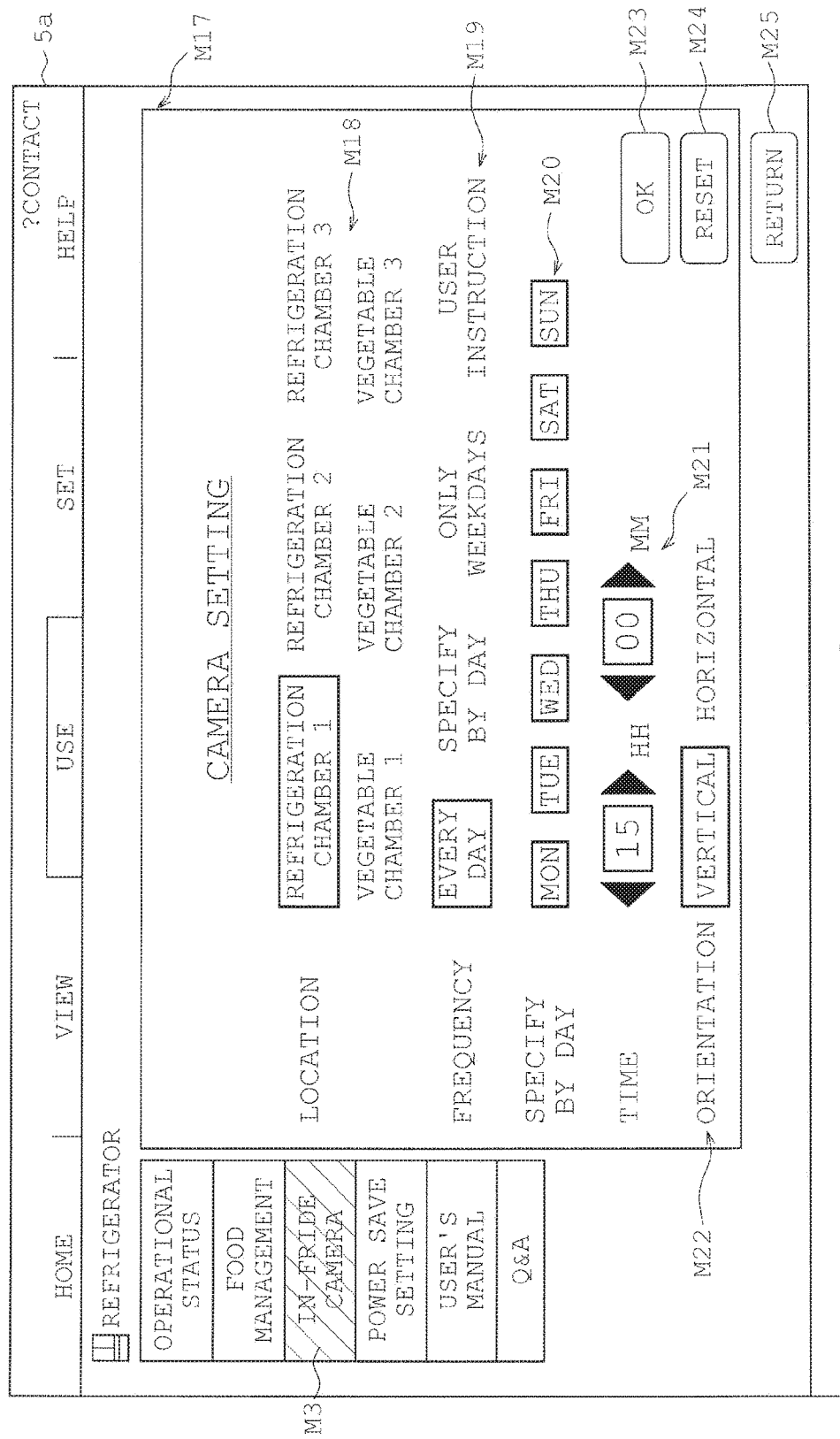

FIG. 8 pertains to the first embodiment and schematically illustrates one example of a setting screen of the mobile terminal.

FIGS. 9A and 9B pertain to a second embodiment and is a schematic view illustrating a camera system.

Figure 10:
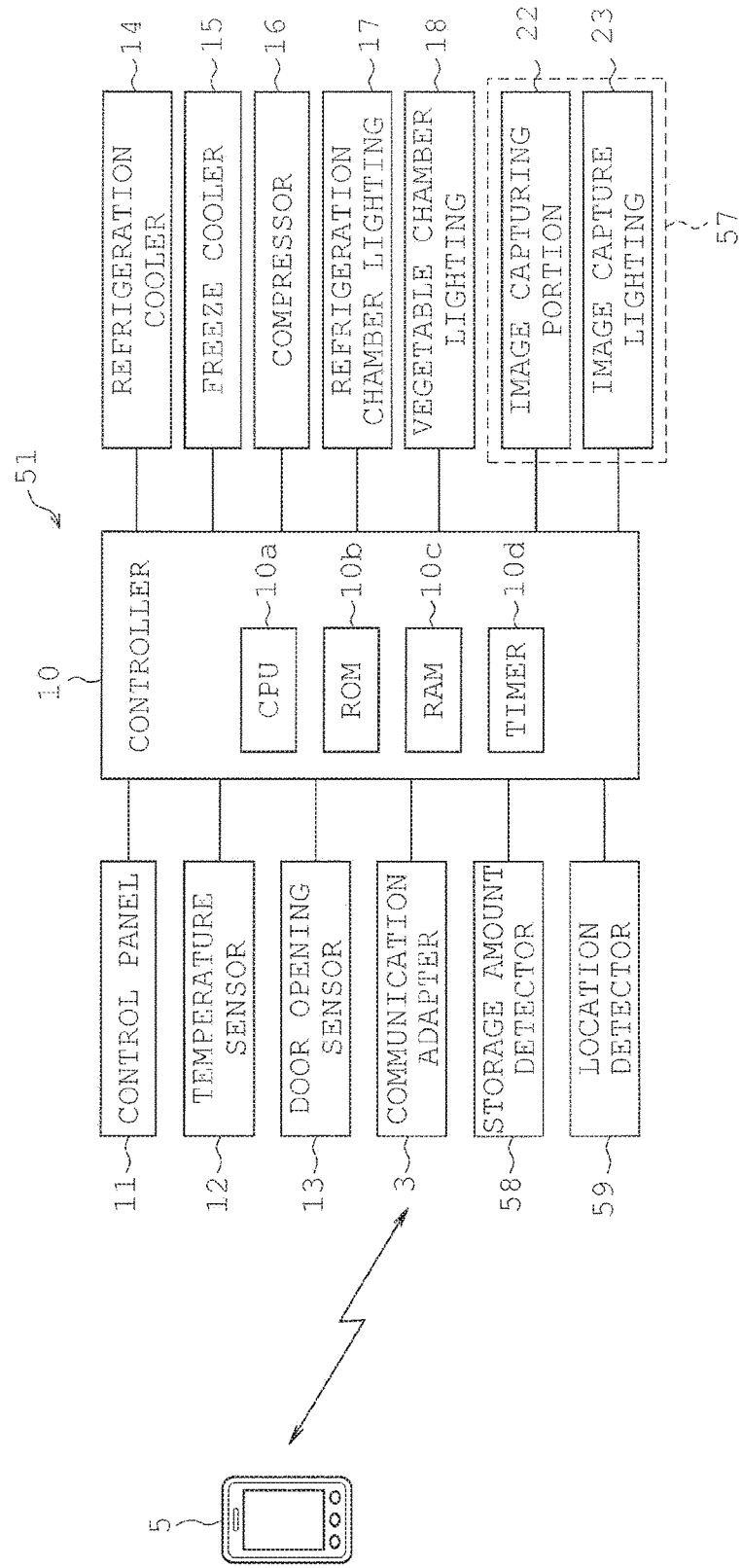

FIG. 10 pertains to the second embodiment and is a schematic view illustrating an electric configuration of the camera system.

Figure 11:
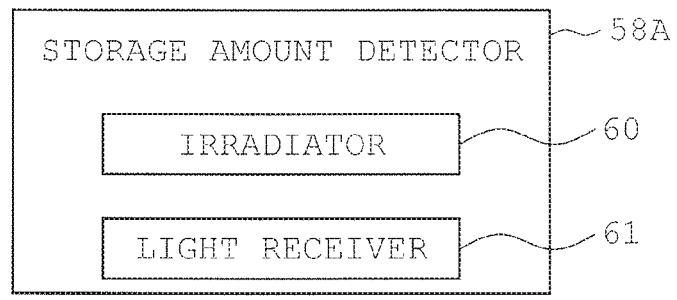

FIG. 11 pertains to the second embodiment and schematically illustrates an electric configuration of a storage amount detector A.

Figure 12:
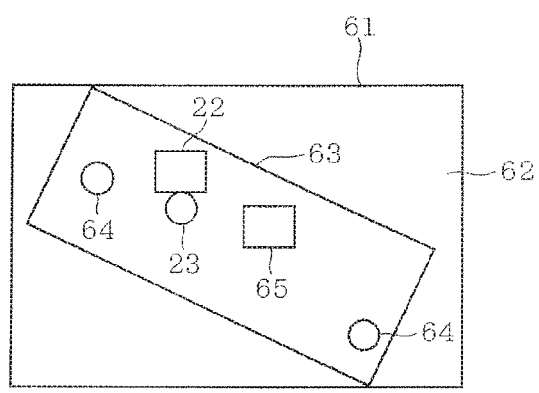

FIG. 12 pertains to the second embodiment and schematically illustrates the configuration of a light receiving portion.

Figure 13:
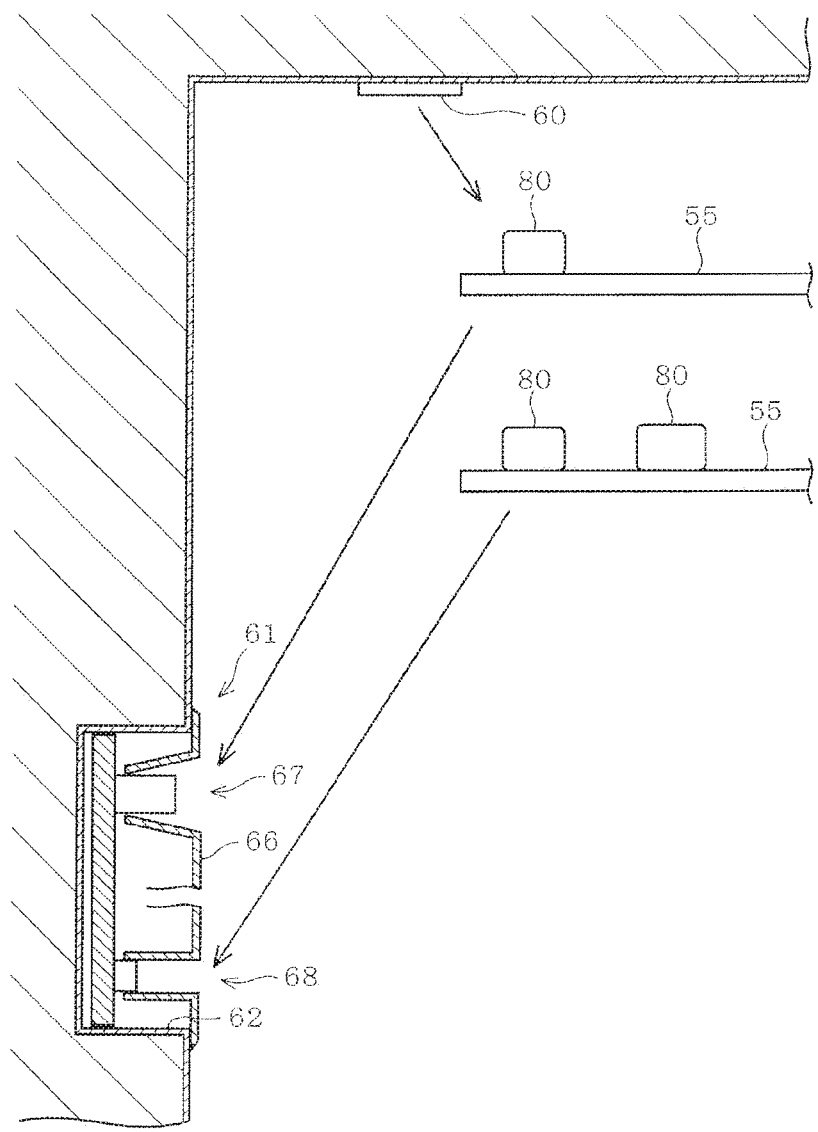

FIG. 13 pertains to the second embodiment and schematically illustrates one aspect of storage amount detection.

Figure 14A:
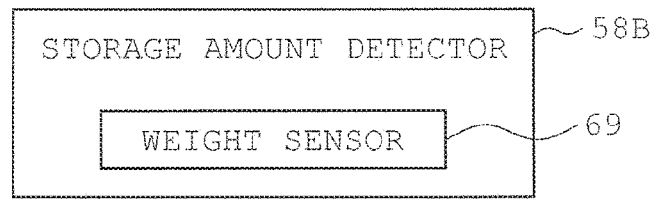
Figure 14B:
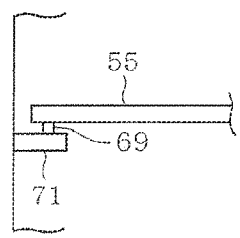
Figure 14C:
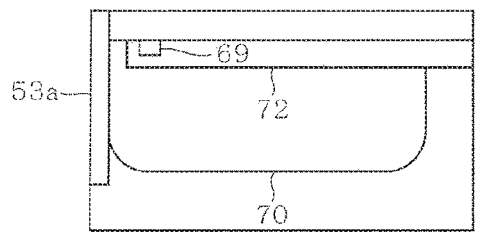

FIGS. 14A, 14B, and 14C pertain to the second embodiment and schematically illustrates an electric configuration of a storage amount detector B.

Figure 15:
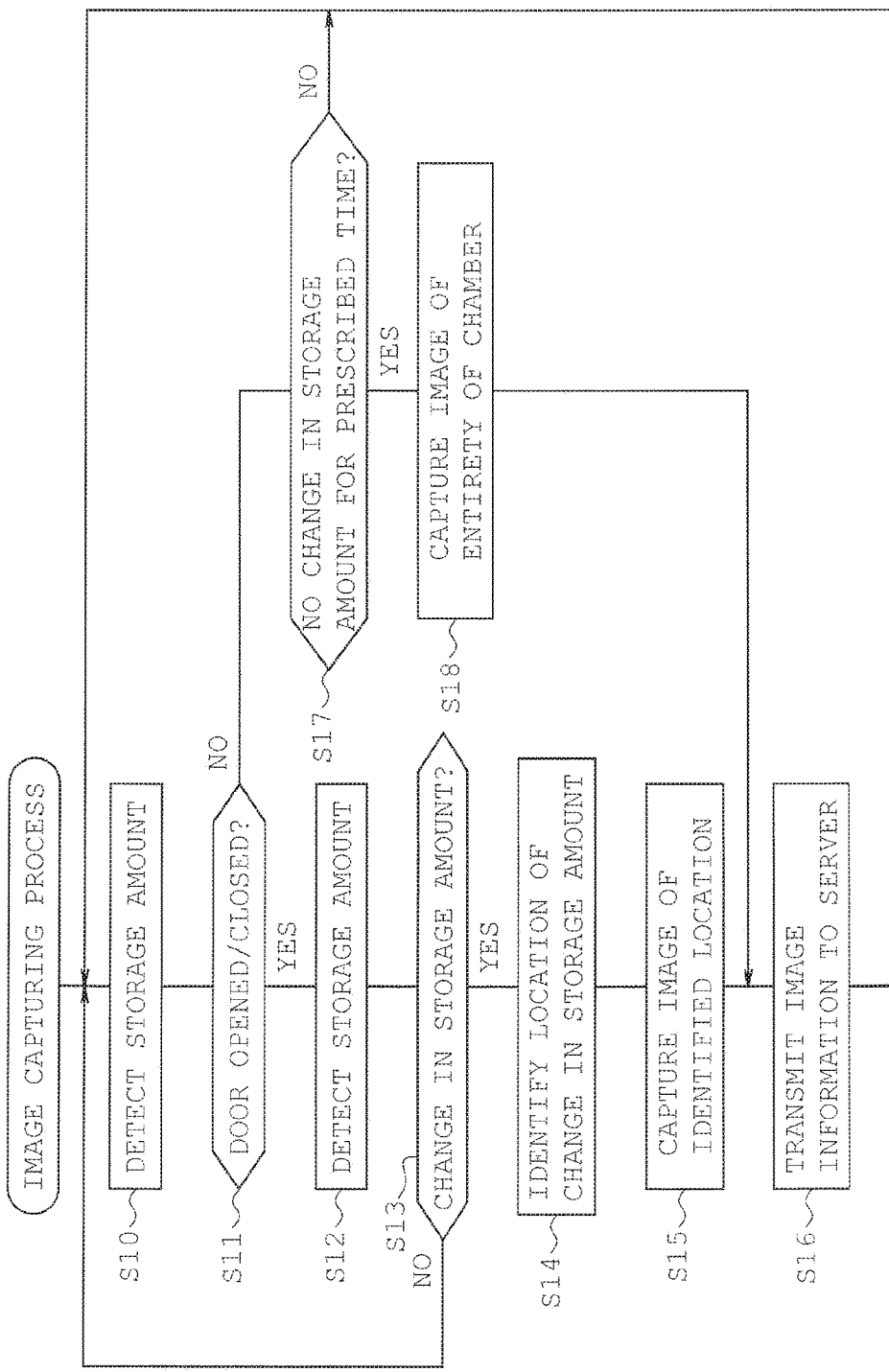

FIG. 15 pertains to the second embodiment and indicates the process flow of the image capturing process.

Figure 16:
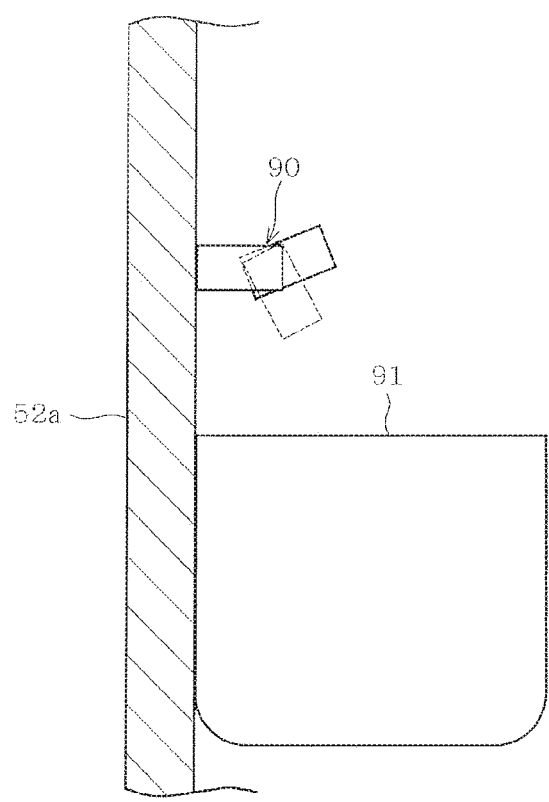

FIG. 16 pertains to one embodiment of a camera device illustrated schematically.

DESCRIPTION

In one embodiment, a camera system is provided a camera device serving as an image capturing unit; a communication unit configured to transmit image information captured by the camera device to an external device; and a display terminal configured to display image information captured by the camera device, the display terminal being configured to display at least either of image information captured by the camera device according to prescribed conditions and image information captured according to user instructions.

Embodiments disclosed herein provide a camera system and a refrigerator capable of readily viewing image information from remote locations, etc.

Embodiments are described hereinafter with reference to the accompanying drawings. Elements that are substantially identical to across the embodiments are identified with identical reference symbols and are not re-described in detail.

First Embodiment

A description will be given on a first embodiment with reference to FIGS. 1 to 8.

As illustrated in FIG. 1, a camera system 1 of the present embodiment is configured by a refrigerator 2 being a subject of image capturing in the present embodiment, a communication adaptor 3 provided to the refrigerator 2, an access point 4 configured to perform wireless communication such as a close range communication with the communication adaptor 3, a mobile terminal (display terminal, external device), server 6, and a camera device 7, etc. disposed inside the refrigerator 2 in the present embodiment. The refrigerator 2, the mobile terminal 5, the server 6, and the camera device 7 are communicably connected to one another through the access point 4 and an external network 8. That is, the camera system 1 serves as an image acquiring system for the refrigerator 2 configured to acquire image inside the refrigerator 2.

The communication adaptor 3 provided to the refrigerator 2 is configured to perform close range wireless communication with the access point 4. In the present embodiment, the communication adaptor 3 is provided detachably (may be later added) to the upper portion of the refrigerator 2. The communication adaptor 3 may be preinstalled in the refrigerator 2. Alternatively, the refrigerator 2 and the access point 4 may be connected by wire communication.

Examples of mobile terminal 5 envisaged in the present embodiment include the so-called smart phone (highly functional mobile phone) and tablet PC. The mobile terminal 5 is configured to be communicable with the refrigerator 2 and the server 6 both from within a residence or outside a residence. The mobile terminal 5 is further capable of communicating with the refrigerator 2 side by way of the external network 8 through wide-range communication even when located inside the residence. A touch panel is provided on a display portion 5a of the mobile terminal 5.

The server 6 is configured by a computer system known in the art. The server 6 is provided with a storing portion configured to store image information. The image information is information (data) containing images. Examples of image information include data (still image, moving image)

of known formats such as a bit map format and JPEG/MPEG format and compressed/encrypted forms of such data as well as converted forms of such data converted by image processing. The image data may come in any format as long as such data can be transmitted to the server 6 and can be viewed through the mobile terminal 5. A still image is envisaged in the present embodiment. The server 6 stores information (such as an IP address) for accessing the refrigerator 2 side and image capturing settings (conditions for capturing images with the camera device 7) in addition to image information.

Next, a description will be given on electric configurations of the refrigerator 2 and the camera device 7 in the camera system 1.

As illustrated in FIG. 2, the refrigerator 2, being the object of image capturing, is provided with a controller 10. The controller 10 is configured by a microcomputer including components such as a CPU 10a, ROM 10b, RAM 10c, and timer 10d. The controller 10 performs an overall control of the refrigerator 2 by executing programs stored in the ROM 10b, etc. More specifically, the controller 10 is configured to control a refrigeration cooler 14 and a freeze cooler 15 provided in a refrigeration cycle known in the art and a compressor 16, etc. based on the in-fridge temperature detected by a temperature sensor 12 and the opened/closed status of the door detected by a door sensor 13 so that operational status set by the control panel 11 can be achieved. The controller 10 is configured to illuminate a refrigeration chamber lighting 17 when the door of the refrigeration chamber is opened and illuminate a vegetable chamber lighting 18 when the door of the vegetable chamber is opened. As later described in detail, the refrigeration chamber lighting 17 and the vegetable chamber lighting 18 also serve as a notifying unit configured to notify the camera device 7 the timing for image capturing. Among the storage chambers of the refrigerator, the refrigeration chamber is formed as a longitudinally elongate space in general and the vegetable chamber is formed as a laterally elongate space in general. This is one example of a configuration of the refrigerator 2.

In the present embodiment, a total of 3 camera devices 7 are provide to the refrigerator 2, namely, 2 in the refrigeration chamber 2 and 1 in the vegetable chamber as illustrated in FIG. 1. More specifically, the camera device 7 is provided in the central portion (indicated as central portion of refrigeration chamber in FIG. 2) of the refrigeration chamber in the inner side (the side in which the door pocket is provided) of the double doors of the refrigeration chamber. Thus, it is possible to capture the image of substantially the entirety of the refrigeration chamber as viewed from the front side, which is close to the view available to the user. The camera device 7 provided in the lower portion of the refrigeration chamber (indicated as lower portion of the refrigeration chamber in FIG. 2) is installed in the lowermost shelf (Not illustrated. Made of transparent material.) of the refrigeration chamber. It is thus, possible for the camera device 7 to capture image of food placed on the lowermost shelf, in most cases, as well as food, etc. placed on the upper side shelves because of the transparency of the shelves. The camera device 7 provided in the vegetable chamber (indicated in FIG. 2) is provided on the door of the vegetable chamber and captures the image of the interior of the vegetable chamber.

The camera device 7 is provided with a camera controller 20. The camera controller 20 is configured by a microcomputer including components such as a CPU 20a, ROM 20b, RAM 20c, and timer 20d. The controller 20 performs an overall control of the camera device 7. The camera controller 20 is connected to a communication module 21, an image capturing portion 22, an image capture lighting 23, a battery 24, an illuminance sensor 25, an acceleration sensor 26, and a temperature sensor 27, etc. The camera controller 20 is responsible for executing controls pertaining to: transmission of image information by the communication module 21; controlling the timing of image capturing by the image capturing portion 22; controlling the illumination of the lighting portion 23 (securing light source used when capturing images); and receiving (accepting) the later described image capturing instructions by an illuminance sensor 25. In the present embodiment, the camera controller 20 is further configured to perform image processing for correcting distortions of the captured images.

The communication module 21 is configured to transmit the image information captured by the image capturing portion 22 to external devices. In the present embodiment, the image information is transmitted to the server 6 through the access point 4 and multiple entries of image information are stored in the server 6 as history log.

The image capturing portion 22 is provided with an image capturing element 22a (Illustrated in FIG. 3. Later described in detail) configured by elements such as CCD and CMOS. The lighting 23 is provided with a light emitting diode (LED) and provides light when capturing images with the image capturing portion 22.

Though not illustrated, the camera device 7 is provided with a power switch as well. The battery 24 supplies electric power to each portions of the camera device 7. The camera device 7 is driven by the battery 24 installed therein. Thus, the camera device 7 is capable of running without power plug cable, etc. and therefore may be installed in any location. The battery 24 employs lithium battery which provides excellent discharge properties even in a relatively cool place such as inside the refrigerator 2.

The illuminance sensor 25 is configured to detect the illuminance of the environment where the camera device 7 has been installed. In the present embodiment, the illuminance sensor 25 detects the illuminance of the fridge interior illuminated by the refrigeration lighting 17 (or the vegetable lighting 18). The illuminance sensor 25 also functions as a receiving unit configured to receive image capturing instructions from the mobile terminal 5 as described in the following.

The camera device 7 is driven by battery 24 as described above. Thus, the battery 24 will not last long when the camera control device 20, etc. are constantly operative. The camera device 7 is thus, normally placed in a low power consuming state such as the sleep mode and is switched to a normal operating mode when at the image capturing timing. It is required to keep some kind of receiving means active in order to receive image capturing instructions from the user. When the communication module 21 is driven in such case, electric power will constantly be consumed even in the absence of the image capturing instructions.

In the present embodiment, the image capturing instructions are received by the refrigerator side communication adaptor 3 and the image capturing instructions are notified indirectly to the camera device 7. More specifically, the camera device 7 normally stands by in a lower power consumption mode and power is supplied to the illuminance sensor 25 which consumes relatively less amount of electric power. When receiving the image capturing instructions, the refrigerator 2 flickers the refrigeration chamber lighting 17 and the vegetable chamber lighting 18 according to a predetermined pattern. The change in the illuminance of the lightings is detected by the illuminance sensor 25 and the camera device 7 returns to the normal operating state. When the pattern of variation in the illuminance matches the prescribed pattern of image capturing instructions, a judgement is made that image capturing instructions have been transmitted. The illuminance sensor 25 functions as a receiving unit configured to receive image capturing instructions.

The acceleration sensor 26 serves as the so-called triaxial sensor which is configured to determine the orientation of the installed camera device 7 (installed position) by detecting the acceleration of the three axes being orthogonal to one another. The camera device 7 of the present embodiment has a body shaped substantially like a cuboid as illustrated in FIG. 3. As illustrated in FIG. 3, the state of the body being oriented so as to be elongate in the up and down direction will be referred to as longitudinal orientation for convenience and the state of the body being oriented so as to be elongate in the left and right direction will be referred to as lateral orientation for convenience.

The camera device 7 shaped as described is provided with an imaging element 22a in which the number of pixels vary in the longitudinal direction and the lateral direction. When the orientation of the camera device 7 is changed from the longitudinal orientation to the lateral orientation, the orientation of the imaging element 22a is changed as well. More specifically, when the camera device 7 is oriented longitudinally, the imaging element 22a is also oriented longitudinally (the number of pixels in the longitudinal direction becomes greater than in the lateral direction) and when the camera device 7 is oriented laterally, the imaging element 22a is also oriented laterally (the number of pixels in the lateral direction becomes greater than in the longitudinal direction). As described earlier, the refrigeration chamber is a longitudinally elongate space and thus, it is preferable to capture images of the interior space with a longitudinal view in order to obtain the widest view. On the other hand, the vegetable chamber is a laterally elongate space as described earlier and thus, it is preferable to laterally orient the camera device 7 in the vegetable chamber. The orientation of the view is determined by the orientation in which the camera device 7 is installed. Thus, the captured image information is preferably displayed to the mobile terminal 5 in the same way as how the user actually sees the refrigerator 2 (meaning that the orientation of the view conforms to the user's view).

Thus, an acceleration sensor 26 is provided so that the camera device 7 is capable of judging the orientation in which it is installed. It is thus, possible to perform image processing (image rotation) to conform the orientation of the view to the user's view regardless of whether the camera device 7 is longitudinally oriented or laterally oriented. In the present embodiment, the camera device 7 located at the central portion of the refrigeration chamber is installed in the longitudinal orientation and the camera devices 7 located at the lower portion of the refrigeration chamber and the vegetable chamber are installed in the lateral orientation.

A temperature 27 is provided to detect the temperature of the location where the camera device 7 is installed. A reference temperature is set to the temperature sensor 27 to serve as a reference in judging where the camera device 7 is installed. For example, when the detected temperature is higher than the reference temperature, a judgement is made that the camera device 7 is installed in the refrigeration chamber. When the detected temperature is lower than the reference temperature, a judgement is made that the camera device 7 is installed in the freezer. When the camera device 7 is installed in an unexpected location, a notification, a suggestion, or a warning may be presented to the mobile terminal 5. For example, when it has been judged that the camera device 7 is installed in the freezer, a message that reads "Camera located in freezer? Relocation to refrigeration chamber or vegetable chamber is recommended" may be displayed as there is a possibility of failure.

Next, a description will be given on the timing of image capturing by the camera device 7.

The camera device 7 executes the image capturing process indicated in FIG. 5. More specifically, when power is turned ON, the camera device 7 proceeds to a low power mode (sleep mode, etc.) which consumes less electric power compared to the normal mode. In the lower power mode, a change in illuminance is detected by the illuminance sensor 25 as described above. Then, the camera device 7 judges whether or not image capturing timing has arrived (step S1). In the present embodiment, two image capturing timings are set as follows.

Prescribed image capturing time: An image capturing time is set to the camera device 7 as the prescribed condition for image capturing. The image capturing time sets forth the timing in which images are regularly captured. The camera device 7 keeps track of time by acquiring the current time from the server 6, etc. or by a timer 20d. A judgement that image capturing timing has arrived is made when reaching the image capturing time. This will be later described in detail.

When receiving image capturing instructions: A judgement is made that the image capturing timing has arrived when detecting change in the illuminance by the illuminance sensor 25 which indicates an image capturing instruction.

When determining that either of the image capturing timings has arrived (step S1: YES), the camera device 7 captures image of the interior of the refrigeration chamber (step S2) and transmits the captured image information to the server 6 (step S3) for example. At step S3, the camera device 7 transmits the image information to the server 6 without the intervention of the refrigerator 2 by communicating directly with the access point 4 through its communication module 21. When receiving the image information, the server 6 stores the image information after associating the image information with image capturing conditions such as the time of image capturing. The server 6 stores imaging history log (see FIG. 6) of prescribed number of image data which contains image information transmitted in the past if any.

The user is allowed to view the image information stored in the server 6 on the mobile terminal 5. A description will be given on how the image information is displayed to the mobile terminal 5 and on the settings made to the camera device 7 with reference to FIGS. 5 to 8.

When the user accesses the server 6, the top screen illustrated in FIG. 5 is displayed to the screen of mobile terminal 5. The top screen is provided with buttons M1 to M9, etc. The operational status button M1 displays information pertaining to the refrigerator 2. The food management button M2 is operated to manage food stored in the fridge. The in-fridge camera button M3 displays image information captured by the camera device 7. The power save setting button M4 is used to set power saving functions of the refrigerator 2. The user's manual button M5 displays operational guidance. The Q&A button M6 invokes the help function. The operational status display section M7 displays the current operational status (power consumption, current settings, and the like) of the refrigerator 2. The latest image display section M8 displays the latest image information. The history button M9 is used to refer to the history log of image information.

When the in-fridge camera button M3 or the history button M9 is touched, the mobile terminal 5 makes a screen transition to the image display screen illustrated in FIG. 6. FIG. 6 illustrates one example of a screen displaying image information captured by the camera device 7 installed near the center of the refrigeration chamber and displays buttons such as time display button M10, image display section M11, select button M12, image capturing button M13, rotate button M14, status display section M15, setting button M16, etc.

The time display button M10 is used to select the image capturing time (image capturing condition) in which the images stored in the server 6 were captured. When either of the time display buttons M10 is touched by the user, an image captured on the time indicated on the button is displayed to the image display section M11. In FIG. 6, the selection of "taken on June 7 PM 3:00" is schematically indicated by hatching. When "taken on June 6 PM 3:00" is touched in this state for example, the content of the image display section M11 changes accordingly. The present embodiment allows, but not limited to, selection of five entries of image information. The number of selections may be modified for example so that the latest image information and the image information of the day before is displayed.

The image display section M11 is a region for displaying the selected image information. FIG. 6 displays the image information captured by the camera device 7 installed near the center of the refrigeration chamber. In this example, a vertically elongate image information is displayed, reflecting the orientation of the camera device 7. The image capturing time of the image information is indicated by the time display button M10. In the present embodiment, the distortion caused by the wide angle lens is corrected in the camera device 7 side and thus, image information free of distortions is displayed in the image display section M11. The mobile terminal 5 displays the image information as well as the image capturing conditions are displayed on the same screen.

The selection button M12 is used for selecting the desired camera device 7 when there are multiple camera devices 7 installed. In the present embodiment illustrated in FIG. 6, three camera devices 7 are provided; one represented as "refrigeration chamber 1" corresponding to the camera device 7 installed near the center of the refrigeration chamber; one represented as "vegetable chamber 1" corresponding to the camera device 7 installed in the vegetable chamber; and one represented as "refrigeration chamber 2" installed at the lower portion of the refrigeration chamber. The user is allowed to display the image information captured by the desired camera device 7 by touching either of the select buttons M12. FIG. 6 schematically illustrates selection of "refrigeration chamber 1" by hatching. The selection button M12 also serves as a button indicating where the camera device 7 is installed. The number of selection buttons M12 being displayed varies depending on the number of camera devices 7 installed. The number of buttons corresponding to the number of camera devices 7 set in the later described setting screen is displayed.

The image capturing button M13 is used to capture image information of the present. When the user touches the image capturing button M13, the above described image capturing instruction is conveyed to the camera device 7 through the refrigerator 2 and the camera device 7 captures image information of the present. The captured image information is transmitted to the server 6 and the content of the image display section M11 is updated.

The rotate button 14 is used to rotate the image displayed in the image display section M11. The rotate button 14 is not frequently used in the present embodiment since the orientation of the view is determined in the camera device 7 side. However, when the camera device 7 is not provided with the acceleration sensor 26 for example, the orientation of the image information may be modified by touching the rotate button 14.

The status display section M15 displays at least either of the status of the camera device 7 and the status of communication with the camera device 7. The status display section M15 also displays the battery 24 life. Examples of "status of the camera" may include the temperature of environment in which the camera device 7 is installed which has been detected by the temperature sensor 27. For example, when the camera device 7 is installed in the freezer cooled below 0 degrees Celsius, dew or fog may develop on the lens. Thus, when the temperature detected by the temperature sensor 27 is below 0 degrees Celsius, a message reading "install camera somewhere else" for example may be displayed in the status display section M15.

When it is not possible to obtain a new image information after, for example, 5 minutes from the user operation of the image capturing button M13, a message describing communication status that may read "communication error" for example may be displayed to the status display section M15 to indicate that a communication error has occurred. The life of the battery 24 may also be identified as the status information of the camera device 7. The mode of displaying the status display section M15 may be changed to notify the user that an error has occurred. For example, the status display section M15 may be displayed in black in normal operation and in red when an error is encountered.

The setting button M16 displays the settings screen (see FIG. 8) for setting various conditions (image capturing settings) to the camera device 7. A description will be later given on the settings screen.

When "vegetable chamber 1" is selected by the select button M12 in the state illustrated in FIG. 6, the image display section M11 displays image information captured by the camera device 7 installed in the vegetable chamber as illustrated in FIG. 7. Because the camera device 7 is laterally oriented, the image display section M11 displays a laterally elongate screen information. The mobile terminal 5 is capable of displaying both image information in a longitudinally oriented view and image information in a laterally oriented view.

When the user touches the setting button M16 in the state illustrated in FIG. 6 or FIG. 7, the mobile terminal 5 makes a screen transition to the setting screen illustrated in FIG. 8. In the camera system 1, it is possible to make image capturing settings of the camera device 7 from the mobile terminal 5. In the setting screen, various settings are made to the camera device 7. The setting screen displays, in an item display section M17, a location setting area M18, a frequency setting area M19, day specifying area M20, time specifying area M21, orientation setting area M22, OK button M23, reset button M24, and return button M25, etc. In the present embodiment, these settings are stored in the server 6 as settings information.

The location setting area M18 sets the location where the camera device 7 is installed. In the present embodiment, six locations, namely, "refrigeration chamber 1", "refrigeration chamber 2", "refrigeration chamber 3", "vegetable chamber 1", "vegetable chamber 2", and "vegetable chamber 3" are prescribed as places of installation to the refrigerator 2. When the camera device 7 has been installed in the refrigeration chamber, the user is to set the location where the camera device 7 is installed by selecting for example "refrigeration chamber 1".

The frequency setting area M19 sets the frequency of image capturing. The following image capturing frequencies (image capturing timings) are preset in the present embodiment. The "every day" setting captures images periodically (regularly) every day when image capturing time arrives. The "day specification" setting captures images periodically on a specified day of the week when the image capturing time arrives. The "only weekdays" setting captures images periodically on weekdays exclusive of Saturdays, Sundays, and holidays when the image capturing time arrives. The "user specification" setting captures images only when instructed by the user. It is possible for the user to select the method of image capturing by the camera device 7 by selecting either of the foregoing choices. That is, the user is allowed to select the method of image capturing by selecting either of the preset image capturing methods in the present embodiment.

Among the choice of image capturing methods, the "user specification" option may be selected alone or in combination with other options. Thus, the camera device 7 is capable of capturing image information periodically and when instructed by the user. The mobile terminal 5 is capable of displaying at least either of the image information captured periodically and the image information captured according to user instruction.

The day specification area M20 displays buttons for selecting the desired day of the week when the "day specification" option is selected in the frequency setting area M19. When the "every day" option is selected, all the days of the week become selected and when the "only weekdays" option is selected Monday to Friday become selected.

The time specification area M21 allows the user to specify the desired time of image capturing. For example, when the user wishes to check the status inside of the refrigerator 2 before getting home, a time before the time of arrival (such as 3:00 PM) may be specified to the image capturing time. If the user is living alone, and wishes to check the status after breakfast, the time for leaving for work (such as 7:00 AM) may be specified.

The orientation setting area M22 sets whether the targeted camera device 7 is oriented longitudinally or laterally. This setting is used primarily when the camera device 7 is not capable of judging the orientation by itself. However, it may also be used as a setting to determine whether the image information indicated in FIG. 6 (example of longitudinal orientation) and FIG. 7 (example of lateral orientation) are to be displayed in the longitudinally elongate style or the laterally elongate style.

The OK button M23 validates (saves) various settings described above and the reset button M24 is used to undo the changes made to the image capturing settings. The return button M25 is used to return to the screen displayed before the screen transition was made to the settings screen.

The camera system 1 allows images captured periodically or when instructions were given by the user to be viewed from remote locations for example through the mobile terminal 5.

The present embodiment described above provides the following effects.

The camera system 1 is provided with the camera device 7 configured to transmit the captured image information to an external device such as the server 6; and a display terminal such as the mobile terminal 5 configured to display image information captured by the camera device 7. The display terminal is configured to display at least either of image information captured by the camera device 7 according to prescribed conditions and image information captured according to user instructions (The present embodiment displays both types of image information). The user is thus, allowed to readily view the image information even from remote locations, etc. through the display terminal such as the mobile terminal 5.

In practice, the status inside the refrigerator 2, being the object of image capturing in the present embodiment, does not change frequently. Thus, in practice, capturing images periodically at a prescribed time will provide sufficient convenience to the user. The user may, of course, provide image capturing instructions when desired. The image capturing timing, specified as prescribed conditions of image capturing, may be the timing when the amount of food storage has changed or the timing when the amount of food storage is presumed to have changed. For example, a weight sensor (food storage amount detecting unit) configured to detect the weight of shelves and containers may be provided and image may be captured when there is change in the weight. It is possible to reduce unnecessary communication by capturing images only when there is change in storage amount. It is further possible to suppress battery consumption. Examples of the food storage amount detecting unit includes an infrared sensor, an image recognition unit, and a light intensity detecting unit configured to detect amount of light inside the fridge. A door opening-closing unit (door opening sensor 13, door opening-closing mechanism using solenoid, etc.) may also be used which presumes that food has been used (taken out) or taken in when the door is opened.

In a system configuration where the server 6 stores the image information as is the case in the present embodiment, the image information can be viewed from anywhere through the internet, etc. Thus, it is not required to provide a large volume storing unit in the camera device 7 side. This reduces manufacturing cost and further suppresses battery 24 consumption since the camera device 7 need not be operative when viewing image information.

The image capturing settings for the camera device 7 can be made through the display terminal such as the mobile terminal 5. This improves user friendliness of the system since the settings can be modified and updated even from remote locations.

The display terminal, one example of which is the mobile terminal 5, is configured to display the image capturing conditions (date, etc.) when the image information was captured. It is thus, possible to readily know when the image was taken. It is possible to known when the image was captured even more easily in the present embodiment since the image information and the image capturing conditions are displayed on the same screen.

The usability of the system is improved since the system may be configured by multiple camera devices 7. It is possible to select the camera device 7 to be used from the display terminal and the image information captured by the selected camera device 7 (the camera device 7 corresponding to the "refrigerator 1" illustrated in FIG. 6 for example) is displayed to the display terminal. It is thus, possible to easily view the image information when multiple camera devices 7 are provided.

The display terminal is configured to display the location where the camera device 7 is installed ("refrigeration chamber 1", "vegetable chamber 1", and "refrigeration chamber 2", etc.). It is thus, possible know where the image information was captured. The present embodiment displays the image information and the location of the camera device 7 on the same screen and thus, it is possible to know the location of the camera device 7 even more easily.

The image capturing methods capable of being pursued by the camera device 7 are preset and are displayed so as to be selectable from the screen of the display terminal. It is possible to easily set the method of image capturing to be pursued by the camera device 7 by selecting either of the image capturing methods.

It is possible to set an image capturing method in which images are captured at a prescribed time. It is thus, possible to readily set a periodic execution of image capturing. The present embodiment allows multiple types of periodic timing of image capturing such as "every day", "day specification", and "only weekdays" options to be set. It is thus, possible to set the desired method of image capturing suitable for the user's lifestyle for example.

It is possible to set an image capturing method in which images are captured when receiving user instruction from the display terminal. It is thus, possible to view the latest image information if desired by the user by providing an image capturing instruction.

The display terminal is configured to display at least either of the status of operation of the camera device 7 and the status of communication with the camera device 7. It is thus, possible to know the state of the camera device 7 and the state of communication, etc.

The camera device 7 is driven by battery 24 and thus, is given greater flexibility in the choosing where to install it since power plug cables can be eliminated. The camera device 7 of the present embodiment provides further flexibility since receiving of image capturing instructions and transmission of image information can be performed through wireless communication.

The display terminal is configured to display the life of the battery 24. It is thus, possible to know when to charge the battery 24. The usability of the system is improved by displaying the image information and the life of the battery 24 on the same screen as is the case in the present embodiment since the life of the battery 24 can be checked when viewing the image information.

The display terminal is configured to display the encountered error with identification of error content. It is thus, possible to know what kind of error was encountered in the camera system 1. If a temperature related error is displayed as is the case in the present embodiment, it is possible to know, for example, that the camera device 7 is disposed in the wrong place. It is possible know that an error has occurred more easily by displaying an explanation of the error when displaying the image information. For example, errors originating from the temperature sensor 27 may be displayed with warnings or suggestions. For example, when the camera device 7 is used in a room and located outside the refrigerator 2, a warning message that reads "abnormal room temperature" may be displayed when detecting excessively high or low temperatures and a suggestive message that reads "turn on the air conditioner" may be displayed. It is thus, possible for the user to view the image of the room (the state of the room) outside the refrigerator 2 as well as the temperature of the room.

These messages may be sent to a registered email address. By enrolling the caregiver who may be the child of the elderly (recipient of care) to the registered email address, it is possible for the user to make suggestions to the elderly to turn on the air conditioner over the phone. The messages may similarly be sent to a user owning a pet. It is possible for the user to hurry back home and turn on the air conditioner. It may also be configured so that the air conditioner is turned ON/OFF from the display terminal. When the image capturing unit is installed to an air conditioner instead of the refrigerator 2, it is possible to utilize the temperature sensor provided to the air conditioner and transmit messages referring to high/low temperatures through the communication unit provided to the air conditioner.

Further, when the temperature sensor of the image capturing unit installed in the refrigerator 2 is momentarily elevated, the temperature sensor may serve as a door opening-closing detecting unit of the refrigerator 2 configured to make a judgement that the door of the refrigerator 2 has been opened. The detection of the opening and closing of the door may be displayed as described above or notification of such detection may be sent to the email address. Especially when the door is left opened for a prescribed time period, a message may be displayed notifying that the door is being left open. It is thus, possible for the user to inform the user's child at home over the phone. In contrast, when the door has not been opened or closed for a prescribed time period (two days for example), a message that may be read "the door has not been opened for two days" may be informed to the user. By sending such messages to the caregiver of the elderly, the caregiver can contact the elderly and ask whether he/she has been eating.

It is possible to build a network system of home appliances for ensuring the safety of care recipient, pet, and small children by providing an image capturing unit and a transmitting unit configured to transmit image information captured by the image capturing unit as described above. Examples of home appliances configuring the networks system of home appliances include the refrigerator 2, the air conditioner, and the camera device 7 as described above.

The view of the camera device 7 becomes longitudinally elongate or laterally elongate depending upon how the camera device 7 is installed (either longitudinally oriented or laterally oriented). The display terminal is capable of displaying the image information of a longitudinally elongate view and image information of a laterally elongate view. It is thus, possible to view the image information through the display terminal even when there is change in the orientation of the camera device 7.

The image captured by the image capturing element 22a may be trimmed for transmission or display. For example, square image information may be displayed. This will keep the shape of the captured image unchanged regardless of whether the camera device 7 is oriented longitudinally or laterally and thus, facilitate the layout when displaying the captured image.

The display terminal is capable of displaying the image information selected by the user from multiple image information captured in the past. It is thus, possible to know how the target of image capturing has changed over time. Examples of the display terminal include a notebook PC and a desk top PC apart from the mobile terminal 5 indicated in the embodiment.

The image capturing unit may be configured so as not to be removable from the refrigerator 2 unlike the camera device 7, and be fixed to the refrigerator 2 to establish electrical connection with the controller 10. In such case, the communication module 21 of the camera device 7 and the communication adaptor 3 of the refrigerator may be integrated to serve as a transmitting unit for transmitting the image information to external devices. It is thus, possible to build a home appliance network connecting the refrigerator 2, the server 6, and the mobile terminal 5, etc.

Second Embodiment

A description will be given on a second embodiment with reference to FIGS. 9 to 15.

As illustrated in FIG. 9A, a refrigerator 51 being the object of image capturing by a camera system 50 of the second embodiment is provided with storage chambers such as a refrigeration chamber 52, a vegetable chamber 53, and a freezer 54. The refrigeration chamber 52 is opened and closed by a left-side door 52a and a right-side door 52b. The vegetable chamber 53 and the freezer 54 are opened and closed by drawer-type doors 53a and 54a, respectively. Multiple shelves 55 are provided inside the refrigeration chamber 52. An in-fridge lighting 56 is provided on the side surface of the interior of the refrigeration chamber 52. The in-fridge lighting 56 is configured by multiple LED lamps 56A as illustrated in FIG. 9B. The in-fridge lighting 56 is located closer to the front surface side of the refrigeration chamber 52 so as to be located between the shelves 55 and the door (more specifically between the shelves 55 and the door pocket not illustrated).

The refrigeration chamber 52 is provided with multiple camera devices 57 located on the inner side of the right-side door 52b and on the sidewall of the refrigeration chamber 52. Door opening sensors 13 are provided on the left-side door 52a and on the right-side door 52b. The camera device 57 and the door opening sensor 13 are provided in the vegetable chamber 53 and in the freezer 54 as well. The camera device 57 provided on the door of the refrigeration chamber 52 is capable of capturing image of the entire refrigeration chamber 52 when the door is closed. The camera device 57, provided so as to be associated with each of the shelves 55, target stored items placed on each of the shelves 55 as objects of image capturing. In the following description, the image capturing unit in general, not limited to the camera device 57, may also be simply referred to as a camera.

The refrigerator 51 of the present embodiment is provided with a storage amount detector 58 (storage amount detecting unit) configured to detect amount of items stored in the storage chambers and a location detector 59 (location detecting unit) configured to detect location of the items stored in the storage chambers. The present embodiment further envisages a configuration in which the image capturing portion 22 (lens portion) and the image capture lighting 23 (image capture lighting unit) are controlled directly by the controller of the refrigerator 51. The image information captured by the camera device 57 is transmitted to the external sever 6 (see FIG. 1) from the communication adaptor 33. An independent camera device 7 (see FIG. 3, etc.) may be employed as was the case in the first embodiment.

Two types of storage amount detectors 58 are employed in the present embodiment. The first one is a storage amount detector 58A configured to detect the overall storage amount of the refrigeration chamber 52. As illustrated in FIG. 11, the storage amount detector 58A is provided with an irradiating portion 60 (irradiating unit) and a light receiving portion 61 (light receiving unit) and is configured to detect the storage amount based on amount of light received by the light receiving portion 61. For example, the irradiating portion 60 is provided at the ceiling of the refrigeration chamber 52 (see FIG. 9A) and the light receiving portion 61 is provide at the lower side surface of the refrigeration chamber 52 (see FIG. 9B). That is, the irradiating portion 60 and the image capture lighting 23 are provided at locations not facing the light receiving portion 61. The irradiating portion 60 is configured to irradiate light of different color (wavelength) compared to the image capture lighting 23 of the camera device 57. More specifically, the irradiating portion 60 irradiates blue light and the image capture lighting 23 irradiates white light. The amount of light irradiated from the irradiating portion 60 is less than the amount of light irradiated from the image capture lighting 23.

The light receiving portion 61 is installed in a storing portion 62 recessed in a rectangular shape into the sidewall of the refrigeration chamber 52. More specifically, the light receiving portion 61 comprises a couple of light receiving sensors 64 implemented on a substrate 63 disposed diagonally inside the storing portion 62 as illustrated in FIG. 12. The two light receiving sensors 64 are substantially located diagonally opposed from one another on the substrate 63 so as to be displaced from one another in the up and down direction and the front and rear direction. The light receiving portion 61 is configured to detect the amount light (illuminance) of the blue light of the irradiating portion 60. One of the multiple camera devices 57 located in the lowermost location is provided on the substrate 63. This camera device 57 is located above the light receiving sensors 64. Image capturing lighting 23 and the camera controller 65 are provided around the camera device 57. The camera controller 65 is configured to control the camera device 57 and produces heat when driven.

The storage amount detecting portion 58A is configured to detect the storage amount based on how the light irradiated from the irradiating portion 60 is received by the light receiving portion 61, in other words, based on the amount of light received by the light receiving portion 61. More specifically, the light irradiated from the irradiating portion 60 reflects off of the walls of the refrigeration chamber 52 interior, the shelves 55, and stored item 80, etc. placed on the shelves 55 and enters the light receiving portion 61 as illustrated in FIG. 13. The amount of light entering the light receiving portion 61 varies from its original amount since it is blocked by the stored items, etc. on its way to the light receiving portion 61. The amount of light received when there is no stored items in the refrigeration chamber 52 may be measured in advance and be set as a reference value. It is possible to detect (or presume) the storage amount of stored items by comparing the amount of light received by the light receiving portion with the reference value.

One side of the storing portion 62 located in the refrigeration chamber 52 side is covered by a cover member 66. The cover member 66 is provided with an image capturing hole 67 and a light receiving hole 68 for the camera device 57 and the light receiving portion 61, respectively. In FIG. 13, the cross sections of the image capturing hole 67 and light receiving hole 68 are schematically indicated in the same figure for convenience of explanation. The walls of the image capturing hole 67 are slanted so as not to interfere with the view of the camera. Light collecting lens and transparent cover, etc. may be provided to the light receiving hole 68. Transparent cover for covering the camera device 57 and camera lens, etc. may be provided to the image capturing hole 67. The lens and the cover are preferably disposed further toward the storing portion 62 from the surface of the cover member 66 so as not be exposed to the surface of the cover member 66 or the surface of the inner surface of the storage chamber. It is thus, possible to prevent the lens and the cover from being contaminated by hand grease, vegetable crumbs, etc. Further, the above described holes maybe sloped downward or thin grooves may be formed to discharge dew condensate (water drops) into the storage chambers by capillary effect when dew develops on the lens and the cover by humidity.

A storage amount detector 58B configured by a weight sensor 69 illustrated in FIG. 14A may be employed in the shelves 55 of the refrigeration chamber 52, the vegetable chamber 53, and storage chambers such as the freezer 54 in which a container 70 is taken in and out by a drawer-type door. The weight sensor 69 provided at a receiving portion 71 of the shelf 55 as illustrated in FIG. 14B and the presence of stored items may be judged when there is increase in the detected weight compared to a reference value obtained by measuring the weight without any stored items. In a drawer type storage chamber as illustrated in FIG. 14C, the weight sensor 69 may be provided on a guide rail 72 side for holding the storage container 70. The presence of stored items may be judged when there is increase in the detected weight compared to a reference value obtained by measuring the weight without any stored items. The weight sensor 69 also functions as a location detector 59 configured to detect the location of the stored items. For example, the weight sensor 69 may be provided on the four corners of the shelf 55 and the location of gravity center may be obtained based on the weight detected by each of the weight sensors 69. It is thus, possible to detect where the stored item is located on the shelf 55.

In the present embodiment, the refrigeration chamber 52 is provided with the storage amount detector 58A configured to detect the overall storage amount and the storage amount detector 58B configured to detect the storage amount and the storage location of each of the shelves 55. The storage amount detector 58B is provided to the vegetable chamber 53 and the freezer 54.

Next, a description will be given on the image capturing timing of the present embodiment.

In the image capturing process indicated in FIG. 15, The controller of the refrigerator 51 is configured to detect the storage amount (step S10) and judge whether or not the door has been opened/closed (step S11). When the door is opened/closed (step S10: YES), the controller re-detects the storage amount (step S12), and if the storage amount remains unchanged (step S12: NO), returns to step S10. When there is change in the storage amount on the other hand (step S12: YES), the controller identifies the location where there is change in the storage amount (step S14) and captures image of such location (step S15).

For example, when the storage amount detector 58A detects change in the storage amount, a judgement is made that the storage amount of the refrigeration chamber 52 as a whole has changed and an image of the entire refrigeration chamber 52 is captured by the camera device 57 provided on the door. If it is possible to identify the location where there was change in the storage amount (such as the uppermost shelf 55 for example) by the location detector 59, the image of the identified location is captured by the camera device 57 associated with such location. The camera device 57 is configured to capture image of the identified location by turning ON the image capture lighting 23. The irradiating portion 60 is not turned ON when image is being captured.

The controller is configured to transmit the captured image information to the server 6 through the communication adaptor (step S16). Using the location detector 59, the controller is further configured to detect the location where there is change in the storage amount detected by the storage amount detector 58 and transmits the detected location to the server 6 along with the image information. Further, the control portion is configured to display the change in the storage amount (result of detection) detected by the storage amount detector 58 through a control panel or a display portion (such as an LED or liquid crystal panel) provided on the door of the refrigerator or transmit the result of detection on the user's mobile terminal. The control panel, the display portion, and the mobile terminal are examples of the informing unit. A food identifying unit may be provided which is configured to identify the food being stored. Information identifying the food in which change in storage amount has been detected may be transmitted along with the captured image. For example, a color identifying unit (may be configured by software executing image processing) capable of color identification may be provided to the camera. When the stored food is colored like blood (reddish or pinkish color), the stored food is presumed to be meat. When a location which used to be a white wall (in a refrigeration in which the inner walls of the storage chamber are colored in white for example) has been changed to a blood-like color, a judgement is made that meat has been added as a stored item. The system may be configured to inform the user to that effect. When the color of the location is changed to a greenish color, a judgement may be made that a greenish vegetable has been added as a stored item. When food colored like blood or food colored in a greenish tone is gone or reduced in amount, full or partial consumption of such food may be informed to the user. That is, the food identifying unit may function as a storage amount detecting unit configured to detect the amount of stored items in addition to identifying the type of food being stored.

A bar code reading unit or function may be provided to the camera. For example, when there is change in the storage amount by milk being stored in the fridge, an image of the milk may be captured while also reading the bar code on the milk. The added storage of milk may be informed through the control panel, etc. by character or graphical information or with the captured image. When an IC tag, etc. is provided on the stored food, a tag detecting unit may be provided in addition to the camera to identify the type of food and inform and/or transmit the information on the stored food (result of identification) to the relevant system components. Examples of information on the stored food include a best-before date, a use-by date, traceability information, cumulative storage time obtained by keeping track of time elapsed from the initial storage into the storage chamber using a time-keeping unit.

When change in the storage amount has not been detected at step S13 (step S13: NO), and when there is no change in the storage amount for a prescribed period (step S16: YES), the controller is configured to capture image of the entire refrigeration chamber 52 (step S17). Images of the entire vegetable chamber 53, the entire freezer 54, and the shelves 55 may be further captured using some or all of the camera devices 57 provided to the refrigerator 51. Then, the controller transmits the captured image information to the server 6 (step S15).

The above described embodiment provides the following effects.

The camera system 50 is provided with the storage amount detecting unit (storage amount detector 58) configured to detect amount of items stored in the storage chamber. Image of the storage chamber is captured by the camera device 57 when there is change in the storage amount detected by the storage amount detecting unit. It is thus, possible to capture image of the storage chamber when there is change in storage amount and detect the change in the storage amount which is valuable to the user.

The door opening-closing detecting unit (door opening sensor 13) configured to detect opened or closed status of the door of the storage chamber is provided. The camera device 57 is configured to capture image of the storage chamber when there is change in the storage amount detected by the storage amount detecting unit (storage amount detector 58) when opening or closing of the door has been detected by the door opening-closing detecting unit. It is thus, possible to inhibit unnecessary execution of image capturing when there is no change in the storage amount, etc.

Image is captured by the camera device 57 when change in storage amount is detected by the storage amount detecting unit after the door of the storage chamber has been closed. Meaning that, image is captured when it is presumed that food has been taken in or out of the storage chamber. It is thus, possible to judge whether or not storage amount has changed even more accurately. "After the door of the storage chamber has been closed" does not have to mean immediately after the door has been closed. For example, image may be captured when prescribed period has elapsed after the door has been closed. It is thus, possible to capture a clear image after, for example, the lens of the camera device 57 has been defogged.

The location detecting unit (location detector 59) is provided which is configured to detect the location of a stored item in which a change in storage amount has been detected by the storage amount detecting unit. The location of the stored item detected by the location detecting unit is transmitted to the relevant system component and thus, it is possible to identify the stored item in which storage amount has changed.

The result of detection by the storage amount detecting unit is informed through the informing unit (control panel, mobile terminal, etc.). It is thus, possible to learn if any food has been added or removed by another person.

Multiple camera devices 57 are provided and image is captured by the camera device 57 located in a position corresponding to where a change in storage amount has been detected by the storage amount detecting unit. It is thus, possible to immediately identify the stored item in which storage amount has been changed.

The storage amount detecting unit is provided with an irradiating unit (irradiating portion 60) configured to irradiate light to a storage and a light receiving unit (light receiving portion 61) configured to receive light inside the storage. The storage amount detecting unit is configured to detect storage amount based on amount of light received by the light receiving unit. It is thus, possible to detect storage amount over wide range of space, for example, the storage amount of the entire refrigeration chamber 52.

The storage amount detecting unit comprises a weight detecting unit (weight sensor 69) and storage amount is detected based on the weight of the stored item disposed on a placement portion (shelves 55, drawer-type storage chambers, etc.) detected by the weight detecting unit. It is thus, possible to detect the amount of stored items disposed in a location where the light from the irradiating portion 60 is unreachable.

Multiple weight detectors are provided at multiple locations inside the storage chamber. The camera device 57 is configured to capture image of a location where storage amount has changed. It is thus, possible to capture image of the location where storage amount has been changed.

Multiple camera devices 57 are provided and image is captured by the camera device 57 located in a position corresponding to where there is change in a result of detection by the weight detecting unit. It is thus, possible to obtain more accurate information on the change in storage amount.

The refrigerator 51 of the present embodiment is provided with the camera device 57 serving as an image capturing unit; a transmitting unit configured to transmit image information captured by the camera device 57 according to prescribed conditions to an external device; and a storage amount detecting unit configured to detect storage amount of a stored item in a storage chamber. The camera device is configured to capture image of the storage chamber when there is change in the storage amount detected by the storage amount detecting unit. It is thus, possible to view the image information easily even from remote locations and be informed of a change in storage amount.

The irradiating unit and the image capturing unit are provided in locations not directly facing the light receiving unit located on the door or the ceiling of the storage chamber. It is thus, possible to prevent erroneous detection of illuminance.

Further, the camera device 57 is provided in a location different from where the light receiving portion 61 is provided. The camera device 57 is provided in locations such as the doors or the side surfaces of the interior of the storage chamber where the amount of light irradiated from the irradiating unit is suppressed. Because incident light into the camera device 57 from the irradiating unit is suppressed in such locations, it is possible to reduce backlight.

The amount and the color of light irradiated by the irradiating unit differs from those of the image capture lighting 23. It is thus, possible to prevent erroneous detection on the part of the light receiving portion 61 when the image capture lighting 23 is turned ON.

The irradiating portion 60 irradiating light which is different from the image capture lighting 23 is not illuminated when capturing images with the camera device 57. It is thus, possible to prevent images from being captured in an abnormal state, for example, images being captured in a bluish tone. Examples of a first light emitting unit configured to emit blue light and not white light include a visible-light-induced photocatalyst device, a corona discharge device, an air dielectric breakdown device, and a display unit. The visible-light-induced photocatalyst device is configured to achieve deodorization and sterilization by exciting catalyst applied on a filter or a wall by irradiating blue light having a wavelength of approximately 400 nm. The corona discharge device generates ions, radicals (active species), and ozone by emitting blue light through air dielectric breakdown. The air dielectric breakdown device such as an electrostatic atomizer is configured to generate charged fine particle water containing OH radicals by applying high voltage between a counter electrode and a discharge electrode which results in bluish white light emitted from the discharge electrode. The display unit is provided inside the storage chamber and comprises an LED, etc. lit in colors such as green, red, and orange for illuminating the press-type operating portions for effecting user control of the refrigerator 51. The first light emitting unit is configured to emit light according to prescribed conditions stored in a computer program. It is possible to capture clear images without interference of unnecessary light by invalidating the control to emit light under the prescribed conditions when capturing images with the camera (that is, priority is placed on image capturing with the camera device and the light is not emitted from the first light emitting unit even when the prescribed conditions are met). The press-type operating portion (in-fridge operating portion) may be configured by a tactile switch provided inside the storing portion 62 and an operating button on the cover member 66.

The visible-light-induced photocatalyst device, the corona discharge device, and the electrostatic atomizer may be controlled to be driven periodically after prescribed time intervals, or to be driven in conjunction with the opening and closing of a damper, etc. The display unit controls its light emission based on the ON/OFF operation of the in-fridge operating portion. The second light emitting unit is configured to illuminate drawer-type storage chambers provided on the bottom surface of the refrigeration chamber 52 such as a chiller chamber and comprises a white color LED or LEDs emitting other colors of light is disposed at a central portion of the interior space of the storage chamber and not on the left-side, right-side, upper-side, and the lower-side walls or doors of the storage chamber. The second light emitting unit is thus, susceptible to be captured by the camera disposed in the left-side, right-side, upper-side, and the lower-side areas and may produce backlight. Thus, the activation of the second light emitting unit is preferably invalidated or turned OFF at the image capturing timing by the camera, or temporarily turned OFF while image capturing is ongoing and re-illuminated after image capturing is finished.

The visible-light-induced photocatalyst may serve as a hydrophilicizer. For example, the visible-light-induced photocatalyst may be coated on the transparent cover covering the camera device 57, the lens of the camera device 57, and the cover member 66 covering the storing portion 62. The lens of the camera or the cover may become fogged by dew condensate when exposed to the storage chamber and cause the captured image to be blurred. Thus, a visible light generating unit such as the first light emitting unit comprising a blue LED, etc. being capable of exciting a catalyst may be provided inside or outside the storing portion 62. By irradiating the photocatalyst by the first light emitting unit, the surfaces of the lens, cover, etc. are activated by moisture in the air and hydrophilicized by OH radical. As a result, dew condensate produced on the surfaces of the lens and the cover become susceptible to bond into a thin film of water. This makes it difficult for water droplets, producing undulations, to form and thereby allow diffused reflection of light to be inhibited and render the surfaces of the lens, cover, etc. difficult to fog. It is thus, possible to capture fogless clear images with the camera by producing a hydrophilicizer on the lens or the transparent cover or exposing the hydrophilicizer to the lens or the transparent cover located in the direction of image capturing of the camera device. The photocatalyst, when being irradiated by light having certain wavelengths, is capable of sterilizing microbes existing in the air and deodorizing odor components (such as organic material) existing in the air by oxidation, degradation. The photocatalyst is also capable of achieving sterilization and deodorization by activating (ionization and radicalization) of components existing in the air. Silver oxide and titanium oxide may be used as a photocatalyst. The blue region of a visible light having a wavelength of approximately 400 nm to 580 nm is used when employing silver oxide (including silver zirconium phosphate). A light emitting diode capable of irradiating light having a wavelength of 380 nm may be used as a light source when employing titanium oxide.

The above described electrostatic atomizer may be provided with a discharge electrode made of a metal material and terminating into a sharp needle-like tip. A voltage of approximately −6 kV may be applied between the discharge electrode and the counter electrode and the metal material used in the discharge electrode is cooled to obtain a dew condensate of moisture contained in the air. Charged fine particle water having particle diameters sized on the order of nanometers (3 to 50 nm) can be obtained by electrostatically atomizing the dew condensate. Bluish white light is repeatedly emitted intermittently at a prescribed interval (5 second interval) from the tip of the discharge electrode while voltage is applied. The electrostatic atomizer is preferably controlled to be driven ON and OFF repeatedly at prescribed regular time period. The electrostatic atomizer may be stored in a cover provided with a discharge port to prevent discharge light from appearing in the captured image. It is possible to prevent discharge light from appearing in the captured image even more effectively by disposing the electrostatic atomizer inside a cover shaped like a duct which is provided on the ceiling of the storage chamber while disposing the camera device 57 on portions other than the ceiling and on portions such as the door or the left and right side walls of the storage chamber which do not face the ceiling. Similar effects can be obtained by disposing the camera device 57 in a storage chamber different from where the electrostatic atomizer is disposed. Failure in capturing clear images with the camera by the poor visibility caused by foggy mist produced by the electrostatic atomizer may be resolved by reducing the size of particle diameters of the mist to be on the order of nanometers. Charged fine particles (containing OH radicals) being on the order of nanometers does not easily produce dew condensates even when placed in contact with the lens of the camera device or the cover and thus, does not easily fog the lens and the cover.

The substrate 63 on which the light receiving unit and the camera device 57 are provided is rectangular and is mounted obliquely with respect to a horizontal plane. By disposing the light receiving portion 61 on a diagonal line, it is possible to secure sufficient distance in the up and down direction as well as the front and rear direction and thereby improve detection accuracy. It further possible to reduce the amount of material used as compared to manufacturing a large rectangular substrate 63 and thereby reduce manufacturing cost.

The camera device 57 provided on the same substrate 63 as the light receiving unit is provided above at least one of the light receiving units. That is, the camera device 57 provided in the lowermost level of the refrigeration chamber 52 is located relatively closer toward the center of the refrigeration chamber 52. As a result, it is possible to capture a wider view of the interior of the refrigeration chamber 52.

The lens portion of the camera device 57 is disposed near the camera controller configured to control the camera device 57. It is thus, possible to warm the lens by the heat produced by the camera controller and thereby promptly defog the lens.

The camera device 57 and the light receiving unit are covered by a cover member 66. The cover member 66 is provided with a light receiving hole 68 configured to allow the light receiving unit to receive light and an image capturing hole 67 configured to allow image capturing by the camera device 57. The light receiving hole 68 and the image capturing hole 67 are independent of one another. It is thus, possible to detect the storage amount as well as capturing clear images.

Other Embodiments

The present invention is not limited to the above described embodiments but may be modified or expanded as follows.

When capturing image information in response to user instructions, it may take time to acquire the image information after providing the instructions depending upon communication traffic and due to execution of the image processing described above. The user may be made to wait for the transmission of the image information in such case. However this may irritate the user for having to repeatedly check for the update of the image information or may dissatisfy the user for simply having to wait. It is thus, possible to send, by email, etc., a notification to the mobile terminal 5 from the camera device 7 side informing that the image information has been transmitted. As a result, the user may divert his/her attention from the camera device 1 once image capturing instructions have been made until image information is transmitted. This will alleviate irritation and dissatisfaction on the part of the user. The URL for accessing information such as those indicated in FIG. 6 may be provided in the email to improve usability so that the image information may be viewed directly from the email without having to invoke an application. Alternatively, the image information may be transmitted directly to the user as an attachment to the email.

The display screens and setting screens discussed in the first embodiment are merely examples and thus, the layout as well as the wordings may be modified as required. For example, the size of the display area of a smartphone differs from the display area of a tablet PC and thus, number of items to be displayed as well as the size of the characters may be modified according to the size of the display area.

The first embodiment envisages a still image to be employed as the image information. A short video (a 10 second video for example) may be taken periodically or taken in response to user instructions.

In the first embodiment, the image information was configured to be transmitted to the server 6. Alternatively, the image information may be transmitted directly to the display terminal such as the mobile terminal 5. The image information may be transmitted directly to the display terminal only when the images are captured in response to user instructions. When transmitting the image information directly to the display device, the image information may also be transmitted to the server 6 and stored as a history log of captured images.

It is possible to eliminate an orientation detecting unit such as the acceleration sensor 26 from the camera device 7.

Some or all of the image processing performed by the camera device 7 may be performed by the server 6. This will reduce battery 24 consumption of the camera device 7. As described earlier, the place of installation as well as the orientation of the camera device 7 are saved in the server 6 as settings information. It is thus, possible for the server 6 to learn the orientation of the camera device 7 based on the settings information and perform image processing such as correcting distortions accordingly.

A laser scanner configured to scan the interior of the storage chamber for example may be employed as the location detecting unit instead of the weight sensor 69 described above. Distribution of temperature inside the storage chamber may be measured by a temperature sensor and the location of the target may be detected based on the temperature distribution. The presence of a stored item will change the flow of cool air. It may thus, be possible to detect the location of the stored item by detecting such change in the cool air flow. The camera device 57 may be employed as the location detecting unit and the location of the stored items may be detected from the captured image. In addition to serving as a location detecting unit, the camera device 57 may be configured to execute an image recognition process, etc. to serve as a stored item identifying unit configured to identify the type of stored item. The camera device 57 may be employed as a food identifying unit configured to primarily identify types of food. The camera device 57 may be employed as an illuminance detecting unit configured to detect illuminance of the storage chamber by judging brightness of the storage chamber from the captured image. A detecting unit may be disposed on the surface of the shelf. The detecting unit may be configured to detect placement of a stored item on the shelf by detecting changes in resistivity or capacitance and further detect the location and the amount of the stored item based on such information.

In the second embodiment, the informing unit was configured to inform a change in storage amount. When the result of detection by the storage amount detecting unit has not changed for a prescribed detection period, a notification may be issued informing that there has not been any change in storage amount.

When the amount of light received by the light receiving unit has exceeded the prescribed reference value, image may be captured by the camera device 57. That is, image may be captured without using the image capture lighting 23 when there is sufficient illuminance. For example, unlike the camera device 57 provided on the door, the view of the camera device 57 provided for the shelf 55 is stationary even when the door is being opened/closed. It is thus, possible to capture images by the illumination provided by incoming external light when the door is opened or by the illumination provided by the in-fridge lighting 56 without using the image capture lighting 23. It is possible to capture image of the door pocket of the adjacent door for example by capturing images while the door is open. It is thus, possible to detect amount of items stored in the door pocket such as beverages.

It can be presumed that stored items have not been taken into or taken out of the storage chamber momentarily after the door has been opened. It is thus, possible to use the image captured at such timing as an image before a change in storage amount takes place. When the amount of light received by the light receiving unit is equal to or less than a predetermined reference value, image may be captured by the camera device 57 by turning ON the in-fridge lighting 56. This will eliminate the necessity to capture images periodically when the door has opened/closed and save further energy. The image capture lighting 23 of the camera device 57 may be used as the irradiating unit and storage amount may be detected by detecting the light by the light receiving unit. Capturing images with the camera device 57 and illumination of the image capture lighting 23 may be inhibited when detecting storage amount using the irradiation unit.

In the second embodiment, camera devices 57 have been provided in different locations. Alternatively, a camera device 90 may be employed which is capable of changing its orientation or the orientation of its view toward the location where there is change in the result of detection by the weight detecting unit or toward the location detected by the location detecting unit. It is thus, possible to reduce the number of camera devices 57 installed. It is further possible to check the status of the door pocket 91, etc. located immediately below the camera device 90 for example. The movable range of the camera device 90 is preferably arranged to allow, for example, the entire region of the refrigeration chamber 52 taken along the up and down direction and the left and right direction to be captured by the camera device 90 including the region immediately below the camera device 90 when the camera device is installed above the door pocket 91. The camera device 57 is preferably disposed above a door pocket provided with an egg container since image of eggs can be captured (while also being capable of detecting the amount of eggs stored).

The locations where the camera devices 57 and irradiation unit 60 are installed in the second embodiment are merely examples and thus, may be installed somewhere else. For example, the arrangement in which the irradiating unit and the image capture lighting do not face the light receiving unit and the arrangement in which the camera device is located in a position different from where the light receiving portion 61 is located and where the amount of light irradiated from the irradiating unit is suppressed may be realized, for example, by providing a dedicated light blocking member between the light receiving portion 61 and irradiating portion 60 and between the light receiving portion 61 and the image capture lighting 23.

In the second embodiment, an example of receiving light emitted from a single irradiating unit was discussed. It also possible to receive light emitted from multiple irradiation units. It is further possible to provide multiple pairs of irradiating unit and light receiving unit. The first light emitting unit described above may keep its control to emit light to be valid even when images are being captured by the camera. By doing so, it is possible to appeal to the user that functions of the visible-light-induced photocatalyst device, the insulation breakdown device (corona discharge, electrostatic atomization), etc. are working well as well as showing the result of operation of the devices by showing the light emitted from the first light emitting unit in the image captured by the camera. Especially when the first light emitting unit is functioning as a display unit, and the fridge is working under a power saving setting, the display unit may operate in an eco mode colored in green. By emitting light in a color evoking a power saving mindset, the user will recognize that the fridge is working in a power saving mode and reinforce the power saving mindset of the user. The first light emitting unit may be configured to be constantly turned ON when capturing images with the camera.

When the second light emitting unit also possesses functionality like the first light emitting unit, such as illuminating a dark chiller chamber where illuminance is low and infridge lighting is hard to reach, the second light emitting unit may likewise be kept validated or turned ON when capturing images with the camera. The in-fridge operating portion may be provided in a storing portion different from the storing portion 52 of the camera device 57 or on a different cover member 66. This will prevent the cover member 66 from deforming as the result of user operation which may stress the lens and consequently produce distorted images or disable image capturing.

In a refrigerator provided with storage chamber (hereinafter referred to as a cooking chamber for convenience) having a cooking feature, a camera device may be provided inside the cooking chamber. The cooking chamber is provided with a heating unit (cooking unit) such as a magnetron and possesses a cooking feature like the so-called microwave oven. The storage container or the shelves provided in the cooking chamber is taken in and out of the fridge by a drawer-type door or a revolving door. It is possible to capture images of the storage container or the shelves in the cooking chamber including the food placed thereon when opening or drawing out the door by providing the camera device on the partition panel located in the upper portion of the cooking chamber. It may be configured to refrain from capturing images while the cooking function such as the magnetron is activated as noise may be produced. Alternatively, the captured image information may be transmitted after cooking is finished, or transmission may be executed more than once in anticipation of transmission errors. The same is applicable when transmitting storage amount or location.

A wireless communication unit (such as Bluetooth (registered trademark) and WiFi) configured to transmit information, such as image captured by camera devices disposed in locations other than the refrigeration chamber, the count of door opening and closing of the refrigerator, and error information, to external components may wirelessly transmit such information while the magnetron is inactivated as there is a possibility of interfering with microwaves and failing. Image capturing instructions given to the camera while the magnetron is activated may be received or retransmitted after the magnetron has been deactivated. It is possible to transmit image information, etc. by disposing the wireless communication unit outside the cooking chamber enclosed in iron plates, etc. being irradiated by microwaves discharged from the magnetron. The same is applicable when transmitting the result of detection by the weight sensor to external components or the controller of the refrigerator through wire or wireless communication.

The radio frequency range of the wireless communication unit may use the 2.4 to 2.5 GHz band, the 5 GHz band, and the 920 MHz band. The 5 GHz band and the 920 MHz band are preferably used since the frequency of microwaves discharged from the magnetron ranges from 2.4 to 2.5 GHz. A wireless communication unit using a frequency band different from the frequency band of the microwave is preferable to prevent interference of frequencies.

The magnetron, when driven, discharges microwaves in a wide frequency range spanning from 2.4 GHz to 2.5 GHz in the initial stage and gradually settles in a relatively narrow frequency range though it may vary depending upon the load, etc. in the cooking chamber. A communication method requiring wide frequency range such as WiFi may overlap and cross talk with the frequencies of the magnetron, possibly disabling communication. A communication method using multiple small spots of frequency bands such as Bluetooth (registered trademark) allows transmission through another frequency band when there is an overlap in a given frequency band and thus, may provide better communication as there is less possibility of cross talk. The same is applicable when the wireless communication unit is used or when selecting a frequency band in a refrigerator not provided with a microwave generating unit but installed in a kitchen in which microwave ovens are often available; or when a camera device intended for use in a kitchen is provided with a wireless communication unit for transmitting information to external components in order to prevent cross talk with the nearby microwave oven.

The lens or the transparent cover provided to the light receiving hole or the image capturing hole may be coplanar with or may protrude from the cover member 66 or the surface of the inner surface of the storage chamber. As a result, it will become easier for the user to clean the lens and the cover where dew condensate and contaminants easily develop, and air blown from the fan will more easily reach the lens and the cover which will facilitate removal of dew condensate and contaminants when an ion generator unit and radical generator unit are provided.

The rotation of a fan feeding cool air may be accelerated when found, by the food identifying unit, that meat has been added to the stored items. It is possible to slow down the spoiling of meat by overcooling. The rotation of the fan may be decelerated compared to cooling meat to exhibit different cooling capacities when found, by the food identifying unit, that vegetables have been added to the stored items. It is possible to prevent damaging of vegetables due to overcooling. Multiple fans may be provided so as to be driven all at once to increase the amount of airflow or so as to be driven in part to relatively reduce the amount of airflow in order to provide a variable cooling capacity. The variable cooling capacity may be realized by controlling amount of opening of a damper.

The checking the status inside the refrigerator from remote locations such as outdoors includes, for example, detachably attaching a communication terminal, serving as an external device to which in-fridge image information is transmitted, on the body of the refrigerator and checking the status inside the refrigerator from the outside of the refrigerator through the image shown on the display portion of the communication terminal without opening the door of the refrigerator with the communication terminal staying attached to the refrigerator. A display portion may be fixed to the door, etc. of the refrigerator to allow the status inside the refrigerator to be checked through the display portion. Further, checking the inside of the refrigerator located in the kitchen from the living room and not from outdoors is also considered to fall within the concept of checking the status from remote locations.

The following embodiments also fall within the scope and the spirit of the invention.

In some embodiments of the camera system, the display terminal is configured to display encountered error, the error being displayed with identification of error content.

In some embodiments of the camera system, the display device is configured to display image information selected by a user from multiple pieces of image information captured in the past.

In some embodiments of the camera system, the display terminal is notified when image information is captured by the camera device.

In some embodiments of the camera system, a door opening-closing detecting unit configured to detect opened or closed status of a door of the storage chamber is provided, the camera device being configured to capture image of the storage chamber when there is change in the storage amount detected by the storage amount detecting unit when opening or closing of the door has been detected by the door opening-closing detecting unit.

In some embodiments of the camera system, an informing unit configured to inform a result of detection by the storage amount detecting unit is provided, the system being configured to inform the result of detection by the storage amount detecting unit.

In some embodiments of the camera system, when there is no change in the result of detection by the storage amount detecting unit for a prescribed detection period, the informing unit being configured to issue a notification informing that no change has been detected.

In some embodiments of the camera system, a location detecting unit configured to detect location of a stored item in which a change in storage amount has been detected by the storage amount detecting unit is provided, the location of the stored item detected by the location detecting unit being transmitted.

In some embodiments of the camera system, the camera device is provided on a substrate where the light receiving unit is provided.

In some embodiments of the camera system, storage amount is detected by the storage amount detecting unit after the door of the storage is closed, and wherein the camera device is configured to capture image of the storage in response to the result of detection of storage amount.

In some embodiments of the camera system, the camera device is configured to capture image when the amount of light received by the light receiving unit is greater than a prescribed reference value.

In some embodiments of the camera system, a lighting unit configured to illuminate interior of the storage is provided, and wherein the camera device is configured to capture image by illuminating the lighting unit when the amount of light detected by the light receiving unit is equal to or less than a prescribed reference value.

In some embodiments of the camera system, the irradiating unit and the image capture lighting unit are each located in a position not facing the light receiving unit.

In some embodiments of the camera system, the camera device is located in a position where amount of light irradiated from the irradiating unit is suppressed, the position being different from a position where the light receiving unit is located.

In some embodiments of the camera system, a plurality of the irradiation units are provided, wherein the light receiving unit is configured to receive light irradiated from the irradiation units, and wherein the camera device is provided in a location not facing with the irradiation units.

In some embodiments of the camera system, the camera device is provided in a location where incidence of light irradiated from the irradiating unit is suppressed.

In some embodiments of the camera system, amount of light and/or color of light irradiated from the irradiating unit differs from the image capture lighting unit.

In some embodiments of the camera system, when the color of light irradiated by the irradiating unit is different from the image capture lighting unit, the irradiating unit is not turned on when image is captured by the camera device.

In some embodiments of the camera system, the substrate on which the camera device and the light receiving unit are provided is rectangular and mounted obliquely with respect to a horizontal plane, wherein the camera device is located upward relative to the light receiving unit, the light receiving unit comprising a light receiving sensor.

In some embodiments of the camera system, the camera device includes a lens portion and a camera control portion configured to control the camera device, the lens portion being located near the lens portion.

In some embodiments of the camera system, the camera device and the light receiving unit are covered by a cover member, wherein the cover member is provided with a light receiving hole configured to allow the light receiving unit to receive light and an image capturing hole configured to allow image capturing by the camera device being independent of one another.

In some embodiments of the camera system, the storage amount detecting unit comprises a weight detecting unit, storage amount being detected based on weight of stored item disposed on a placement portion detected by the weight detecting unit.

In some embodiments of the camera system, a plurality of the weight detectors are provided at multiple locations inside the storage chamber, the camera device being configured to capture image of a location where storage amount has changed. In some embodiments of the camera system, a plurality of the camera devices, wherein image is captured by the camera device located in a position corresponding to where there is change in a result of detection by the weight detecting unit.

In some embodiments of the camera system, the camera device is configured to be capable of changing orientation of a body thereof or a view thereof toward a portion where there is change in the result of detection by the weight detecting unit.

In some embodiments of the camera system, a food identifying unit configured to identify food is provided, and an informing unit configured to provide information pertaining to food identified by the food identifying unit, the system being configured to provide information pertaining to food identified by the food identifying unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera system comprising:
   a camera provided in a storage chamber of a refrigerator and configured to capture an entire image of the storage chamber, the storage chamber comprising one or more shelves or containers;
   a communication adapter configured to transmit image information captured by the camera to an external device provided outside the refrigerator;
   a display terminal provided outside the refrigerator and configured to display the image information, the display terminal being configured to display at least either of first image information captured by the camera according to prescribed conditions and second image information captured by the camera according to user instructions;
   a weight sensor configured to detect a weight of a stored item disposed on a placement portion in the storage chamber; and
   a controller configured to detect a storage amount of the stored item based on the weight detected by the weight sensor for each shelf or each container and to cause the camera to capture an image of the storage chamber in response to a change in the detected storage amount for each shelf or each container.

2. The camera system according to claim 1, wherein at least one image capturing setting for the camera is specifiable from the display terminal.

3. The camera system according to claim 2, wherein the display terminal is configured to display conditions applied to captured image information in addition to the captured image information.

4. The camera system according to claim 1, wherein the display terminal displays conditions applied to captured image information in addition to the captured image information.

5. The camera system according to claim 1, further comprising a plurality of the cameras, wherein the display terminal is configured to display image information captured by one or more of the cameras selected by a user.

6. The camera system according to claim 1, wherein the display terminal is configured to display a location where the camera is installed.

7. The camera system according to claim 1, wherein the display terminal is configured to display a selection screen for selecting one of a plurality of image capturing methods registered to the camera.

8. The camera system according to claim 7, wherein the image capturing methods include capturing the image at a preset time or capturing the image in response to receiving image capturing instructions from the display terminal.

9. The camera system according to claim 1, wherein a view of the camera is configured as one of longitudinally elongate or horizontally elongate depending upon how the camera device is installed, wherein the display terminal is configured to display image information in a longitudinally elongate view and in a horizontally elongate view.

10. The camera system according to claim 1, further comprising a plurality of the cameras, wherein the image is captured by a camera of the plurality of the cameras located in a position corresponding to where the change in storage amount has been detected by the controller.

11. The camera system according to claim 1, further comprising a light source configured to irradiate light to the storage chamber and a light receiver unit configured to receive light inside the storage chamber, wherein the controller also detects storage amount based on an amount of light received by the light receiver.

12. The camera system according to claim 11, wherein the camera and the light receiver are covered by a cover member, and wherein the cover member is provided with a light receiving hole configured to allow the light receiver to receive light and an image capturing hole configured to allow image capturing by the camera being independent of one another.

13. The camera system according to claim 1, further comprising a light source configured to be illuminated during image capturing, and wherein the controller also detects the storage amount by receiving light produced by the light source by the light receiver during image capturing.

14. The camera system according to claim 1, further comprising a non-white first light emitting unit or a second light emitting unit located in a position different from left side, right side, upper side, and lower side walls of the storage chamber as well as from a door of the storage chamber, wherein the first light emitting unit or the second light emitting unit are inactivated when capturing image with the camera.

15. A refrigerator comprising:
   a camera provided in a storage chamber of the refrigerator and configured to capture an entire image of the storage chamber, the storage chamber comprising one or more shelves or containers;
   a communication adapter configured to transmit image information captured by the camera according to prescribed conditions to an external device provided outside the refrigerator;
   a weight sensor configured to detect a weight of a stored item disposed on a placement portion in the storage chamber; and
   a controller configured to detect a storage amount of the stored item based on the weight detected by the weight sensor for each shelf or each container and to cause the camera to capture an image of the storage chamber in response to a change in the detected storage amount for each shelf or each container.

* * * * *